(12) United States Patent
Dimitrov et al.

(10) Patent No.: US 10,795,646 B2
(45) Date of Patent: Oct. 6, 2020

(54) METHODS AND SYSTEMS THAT GENERATE PROXY OBJECTS THAT PROVIDE AN INTERFACE TO THIRD-PARTY EXECUTABLES

(71) Applicant: VMware, Inc., Palo Alto, CA (US)

(72) Inventors: Vladimir Dimitrov, Sofia (BG); Julian Vassev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 178 days.

(21) Appl. No.: 15/644,248

(22) Filed: Jul. 7, 2017

(65) Prior Publication Data

US 2019/0012150 A1 Jan. 10, 2019

(51) Int. Cl.
| | |
|---|---|
| *G06F 9/44* | (2018.01) |
| *G06F 8/30* | (2018.01) |
| *G06F 8/41* | (2018.01) |
| *G06F 9/455* | (2018.01) |
| *G06F 9/445* | (2018.01) |
| *G06F 9/54* | (2006.01) |
| *G06F 8/34* | (2018.01) |
| *G06F 9/46* | (2006.01) |

(52) U.S. Cl.
CPC ............... *G06F 8/30* (2013.01); *G06F 8/315* (2013.01); *G06F 8/41* (2013.01); *G06F 9/44526* (2013.01); *G06F 9/45558* (2013.01); *G06F 9/54* (2013.01); *G06F 8/34* (2013.01); *G06F 9/465* (2013.01); *G06F 9/548* (2013.01); *G06F 2009/45579* (2013.01)

(58) Field of Classification Search
CPC . G06F 9/548; G06F 9/465; G06F 8/34; G06F 8/30; G06F 8/315; G06F 8/41

USPC .......................................................... 717/108
See application file for complete search history.

(56) References Cited

U.S. PATENT DOCUMENTS

| | | | | |
|---|---|---|---|---|
| 5,642,511 | A * | 6/1997 | Chow ....................... | G06F 8/24 715/967 |
| 6,637,020 | B1 * | 10/2003 | Hammond ................ | G06F 8/34 717/107 |
| 6,832,223 | B1 * | 12/2004 | Scheifler ................. | G06F 9/465 |
| 7,181,745 | B1 * | 2/2007 | Foti .......................... | G06F 9/546 719/310 |
| 7,249,377 | B1 * | 7/2007 | Lita ..................... | G06F 21/6236 380/255 |

(Continued)

OTHER PUBLICATIONS

Title: Delegation-based semantics for modularizing crosscutting concerns, author: H Schippers et al, published on 2008.*

(Continued)

*Primary Examiner* — Chameli Das

(57) ABSTRACT

The current document is directed to methods and systems that that generate proxy-object interfaces to external executable code for use in workflows executed by a workflow-execution system. The workflow-execution-engine component of a cloud-management system provides one example of a workflow-execution system in which proxy-object interfaces to external executable code are used. In one implementation, an existing automated-code-generation subsystem generates plug-in class declarations that represent one or more external executables. An additional class-wrapping subsystem then generates a proxy class for each code-generated plug-in class.

18 Claims, 43 Drawing Sheets

(56) References Cited

U.S. PATENT DOCUMENTS

| | | | | |
|---|---|---|---|---|
| 7,516,447 B2* | 4/2009 | Marvin | ............... | G06F 9/465 |
| | | | | 717/108 |
| 7,921,409 B2* | 4/2011 | Shepard | ............... | G06F 8/74 |
| | | | | 717/108 |
| 2003/0167358 A1* | 9/2003 | Marvin | ............... | G06F 9/465 |
| | | | | 719/328 |
| 2003/0236925 A1* | 12/2003 | Balek | ............... | G06F 9/465 |
| | | | | 719/328 |
| 2007/0234312 A1* | 10/2007 | Shepard | ............... | G06F 8/30 |
| | | | | 717/136 |
| 2009/0133042 A1* | 5/2009 | Forin | ............... | G06F 9/4411 |
| | | | | 719/331 |
| 2014/0189672 A1* | 7/2014 | Raundahl Gregersen | ............... | |
| | | | | G06F 8/656 |
| | | | | 717/168 |

OTHER PUBLICATIONS

Title: Ganga: a tool for computational-task management and easy access to Grid resources, author: JT Mościcki et al, published on 2009.*

* cited by examiner

| | | |
|---|---|---|
| 1402 — Start Workflow | The starting point of the workflow. All workflows contain this element. A workflow can have only one start element. Start elements have one output and no input, and cannot be removed from the workflow schema. | |
| 1408 — Scriptable task | General purpose tasks you define. You write JavaScript functions in this element. | |
| 1406 — Decision | A boolean function. Decision elements take one input parameters and return either true or false. The type of decision that the element mtakes depends on the type of the input parameter. Decision elements let the workflow branch into different directions, depending on the input parameter the decision element receives. If the received input parameter corresponds to an exepected value, the workflow continues along a certain route. If the input is not the expected value, the workflow continues on an alaternative path. | |
| 1407 — Custom decision | A boolean function. Custom decisions can take several input parameters and process them according to custom scripts. Returns either true or false. | |
| | Decision activity | A boolean function. A decision activity runs a workflow and binds its output parameters to a true or a false path. | |
| 1410 — User interaction | Lets users pass new input parameters to the workflow. You can design how the user interaction element presents the request for input parameters and place constraints on the parameters that users can provide. You can set permissions to determine which users can provide the input parameters. When a running workflow arrives at a user interaction element, it enters a passive state and prompts the user for input. You can set a timeout period within which the users must provide input. The workflow resumes according to the data the user passes to it, or returns an exception if the timeout period expires. While it is waiting for the user to respond, the workflow token is in the waiting. | |
| 1412 — Waiting timer | Used by long-running workflows. When a running workflow arrives at a Waiting Timer element, it enters a passive state. You set an abosoulte date at which the workflow resumes running. While it is waiting for the date, the workflow token is in the waiting-signal state. | |
| 1413 — Waiting event | Used in long-running workflows. When a running workflow arrives at a Waiting Event element, it enters a passive state. You define a trigger event that the workflow awaits before it resumes running. While it is waiting for the event, the workflow token is in the waiting-signal state. | |
| 1404 — End workflow | The end point of a workflow. You can have multiple end elements in a schema, to represent the various possible outcomes of the workflow. End elements have one input with no output. When a workflow reaches an End Workflow element, the workflow token enters the completed state. | |

FIG. 14A

| | | | |
|---|---|---|---|
| 1414 | Thrown exception | Creates an exception and stops the workflow. Multiple occurrences of this element can be present in the workflow schema. Exception elements have one input parameters, which can only be of the String type, and have no output parameter. When a workflow reaches an Exception element, the workflow token enters the failed state. | |
| 1426 | Workflow note | Lets you annotate sections of the workflow. You can stretch notes to delineate sections of the workflow. You can change the background color to the notes to differentiate workflow zones. Workflow notes provide only visual information, to help you understand the schema. | |
| 1424 | Action element | Calls on an action from the Orchestrator libraries of action. When a workflow reaches an action element, it calls and runs that action. | |
| 1422 | Workflow element | Starts another workflow synchronously. When a workflow reaches a Workflow element in its schema, it runs that workflow as part of its onwn process. The original workflow continues only after the called workflow completes its run. | |
| 1420 | Foreach element | Runs a workflow on every element from an array. For example, you can run the Rename Virtual Machine workflow on all virtual machines from a folder. | |
| 1423 | Asynchronous workflow | Starts a workflow asynchronously. When a workflow reaches an asynchronous workflow element, it starts that workflow and continues its own run. The original workflow does not wait for the called workflow to complete. | |
| 1428 | Schedule workflow | Create a task to run the workflow at a set time, and then the workflow continues its run. | |
| 1429 | Nested workflows | Starts several workflows simultaneously. You can choose to nest local workflows and remote workflows that are in a different Orchestrator server. You can also run workflows with different credentials. The workflow waits for all the nested workflows to complete before continuing its run. | |
| 1415 | Handle error | Handles an error for a specific workflow element. The workflow can handle the error by creating an exception, calling another workflow, or running a custom script. | |
| 1416 | Default error handler | Handles workflow errors that are not caught by standard error handlers. You can use any available scheme elements to handle errors. | |
| 1418 | Switch | Switches to alternative workflow paths, based on workflow attribute or parameter. | |

FIG. 14B

| Server Role | Inbound Ports | Service/System Outbound Ports |
|---|---|---|
| vCloud Automation Center | | |
| vCenter Single Sign-On | 7444 | LDAP: 389<br>LDAPS: 636<br>vCenter Single Sign-On: 11711, 11712, 12721 |
| vCloud Automation Center virtual Appliance (VA) | 443, 5432-, 5672* | vCenter Single Sign-On Load Balancer: 7444<br><br>vCloud Automation Center virtual appliances (VA): 5432, 5672-<br><br>vCloud Automation Center Infrastructure Web Load Balancer: 443<br><br>vCloud Orchestrator Load Balancer: 8281<br><br>*This is a communication requirement between clustered vCAC virtual appliances. |
| Infrastructure Web Server | 135, 443, 1024-65535* | vCenter Single Sign-On Load Balancer: 7444<br>vCloud Automation Center virtual appliance Load Balancer: 443<br>MSSQL: 135, 1433, 1024-65535* |
| Infrastructure Manager Server | 135, 443, 1024-65535* | vCloud Automation Center Infrastructure Web Load Balancer: 443<br>MSSQL: 135, 1433, 1024-65535* |
| Infrastructure DEM Server | NA | vCenter Single Sign-On Load Balancer: 7444<br><br>vCloud Automation Center virtual appliance Load Balancer: 443<br><br>vCloud Automation Center Infrastructure Web Load Balancer: 443<br><br>vCloud Automation Center Infrastructure Manager Load Balancer: 443 |
| Infrastructure Agent Server | NA | vCloud Automation Center Infrastructure Web Load Balancer: 443<br><br>vCloud Automation Center Infrastructure Manager Load Balancer: 443 |
| MSSQL Database Server | 135, 1433, 1024-65535* | Infrastructure Web Server: 135, 1024-65535*<br><br>Infrastructure Management Server: 135, 1024-65535* |
| | Do not change or block these ports: | |
| vCloud Application Services Server | 8443 HTTPS User Interface connection<br><br>8080 HTTP (legacy port; do not use) | vCenter Single Sign-On: 1433<br><br>vCloud Automation Center virtual appliance Load Balancer: 443<br><br>vCloud Automation Center Infrastructure Web Load Balancer: 443 |
| vFabric RabbitMQ | 5671 AMQP over SSL | |
| External SSH connection | 22 | |
| Content Server | 80 HTTP (used to host OOB content, agent binary, and CLI binary) | |
| IT Business Management Suite Standard Edition Server | | vCenter Single Sign-On: 1433<br><br>vCloud Automation Center virtual appliance Load Balancer: 443<br><br>vCloud Automation Center Infrastructure Web Load Balancer: 443 |
| IT Business Management Suite Standard Edition UI connection | 443 HTTPS | |
| External SSH connection | 22 | |
| Web console access (VAMI) | 5480 | |

FIG. 16B

| Load Balancer | Ports Balanced |
|---|---|
| vCenter Single Sign-On Load Balancer | 7444 |
| vCloud Automation Center virtual appliance Load Balancer | 443 |
| vCloud Automation Center Infrastructure Web Load Balancer | 443 |
| vCloud Automation Center Infrastructure Manager Service Load Balancer | 443 |
| vCloud Orchestrator Load Balancer | 8281 |

FIG. 16C

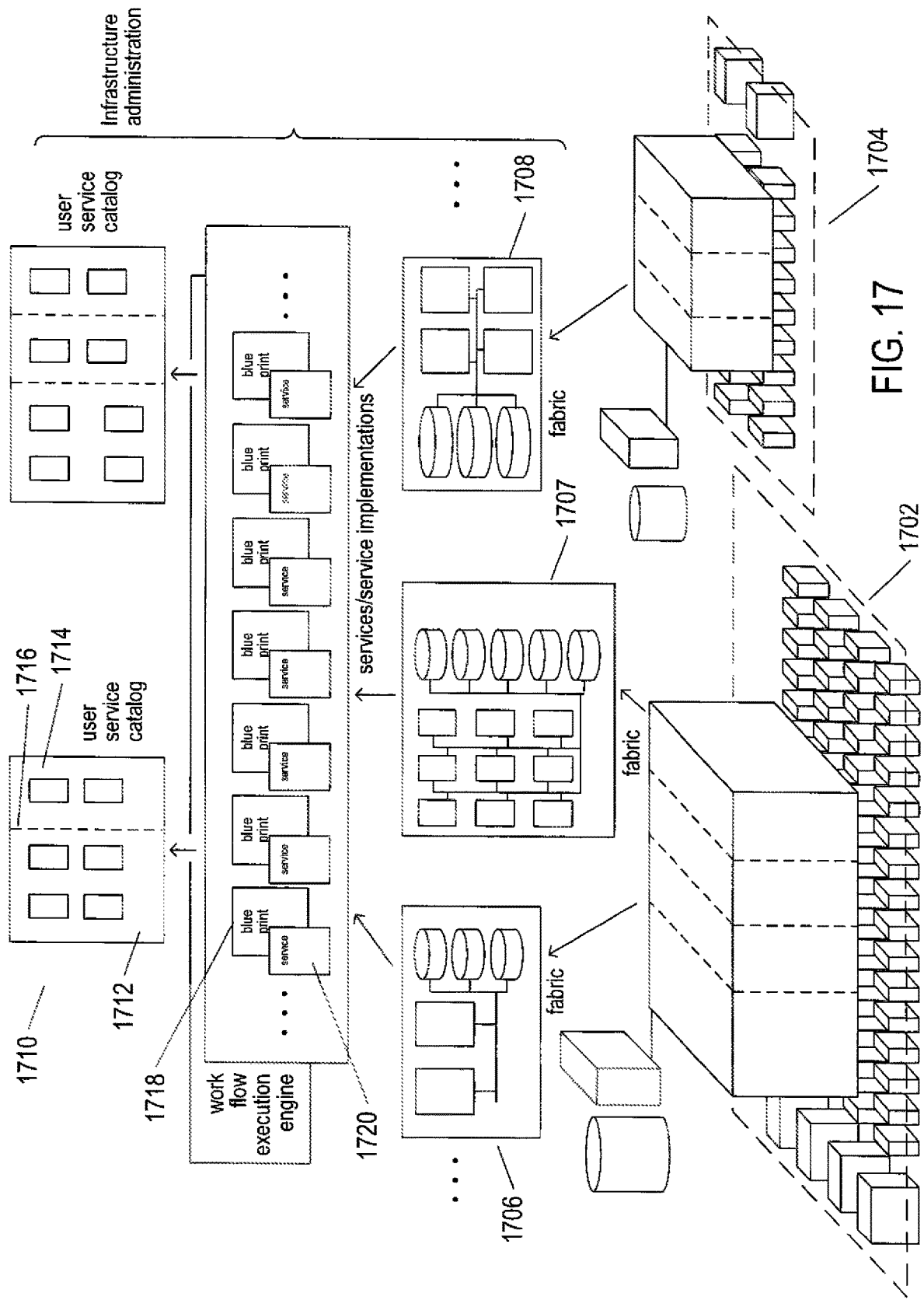

```
class A
{
int method_x1(int a, int b, char * ptr);
void method_x2 (matrix * m, int i, int j);
double method_x3();
. . .                    — 2412
}
```
— 2410 wrapper for class A

FIG. 24B

METHODS AND SYSTEMS THAT GENERATE PROXY OBJECTS THAT PROVIDE AN INTERFACE TO THIRD-PARTY EXECUTABLES

TECHNICAL FIELD

The current document is directed to workflow-execution systems and, in particular, to methods and systems that generate proxy objects for plug-in objects that represent interfaces to third-party executable code within tasks executed by a workflow-execution system.

BACKGROUND

Early computer systems were generally large, single-processor systems that sequentially executed jobs encoded on huge decks of Hollerith cards. Over time, the parallel evolution of computer hardware and software produced main-frame computers and minicomputers with multi-tasking operation systems, increasingly capable personal computers, workstations, and servers, and, in the current environment, multi-processor mobile computing devices, personal computers, and servers interconnected through global networking and communications systems with one another and with massive virtual data centers and virtualized cloud-computing facilities. This rapid evolution of computer systems has been accompanied with greatly expanded needs for computer-system management and administration. Currently, these needs have begun to be addressed by highly capable automated management and administration tools and facilities. As with many other types of computational systems and facilities, from operating systems to applications, many different types of automated administration and management facilities have emerged, providing many different products with overlapping functionalities, but each also providing unique functionalities and capabilities. Owners, managers, and users of large-scale computer systems continue to seek methods and technologies to provide efficient and cost-effective management and administration of, and development of applications within, cloud-computing facilities and other large-scale computer systems.

SUMMARY

The current document is directed to methods and systems that that generate proxy-object interfaces to external executable code for use in workflows executed by a workflow-execution system. The workflow-execution-engine component of a cloud-management system provides one example of a workflow-execution system in which proxy-object interfaces to external executable code are used. In one implementation, an existing automated-code-generation subsystem generates plug-in class declarations that represent one or more external executables. An additional class-wrapping subsystem then generates a proxy class for each code-generated plug-in class.

BRIEF DESCRIPTION OF THE DRAWINGS

FIGS. 14A-B include a table of different types of elements that may be included in a workflow.

FIGS. 16A-C illustrate an example implementation and configuration of virtual appliances within a cloud-computing facility that implement the workflow-based management and administration facilities of the above-described WFMAD.

FIG. 17 illustrates the logical components of the infrastructure-management-and-administration facility of the WFMAD.

FIGS. 24A-B illustrate the currently disclosed approach to interface development.

DETAILED DESCRIPTION

Figure 1:
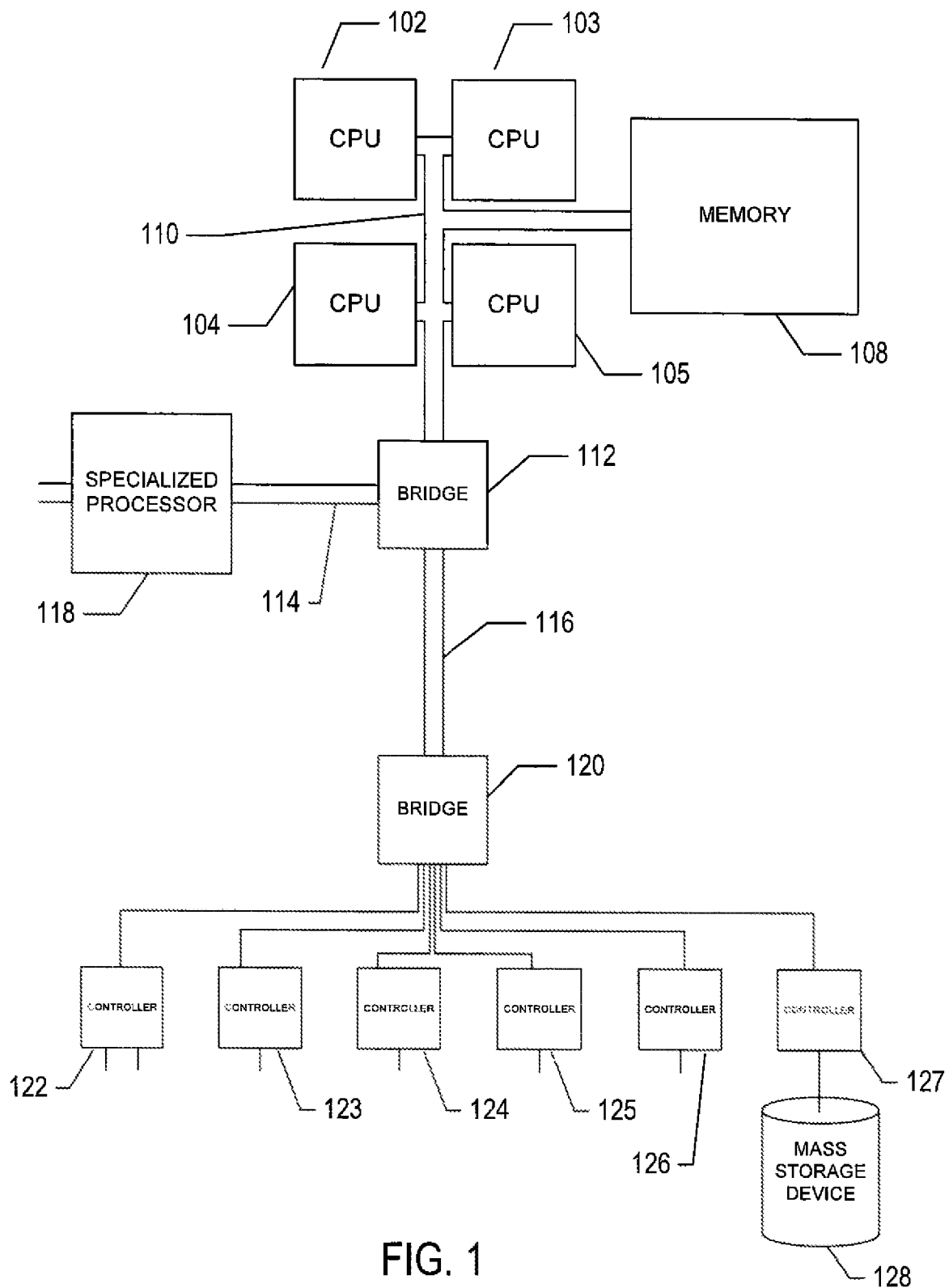
FIG. 1 provides a general architectural diagram for various types of computers.

The current document is directed to methods and systems that methods and systems that generate plug-ins for a workflow-execution-engine component of a cloud-management system. In a first subsection, below, a detailed description of computer hardware, complex computational systems, and virtualization is provided with reference to FIGS. 1-10. In a second subsection, discussion of a workflow-based cloud-management facility that includes a workflow-execution engine is provided with reference to FIGS. 11-20B. Finally, in a third subsection, methods and systems for checking the reachability and responsiveness of endpoints and external tasks are discussed.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
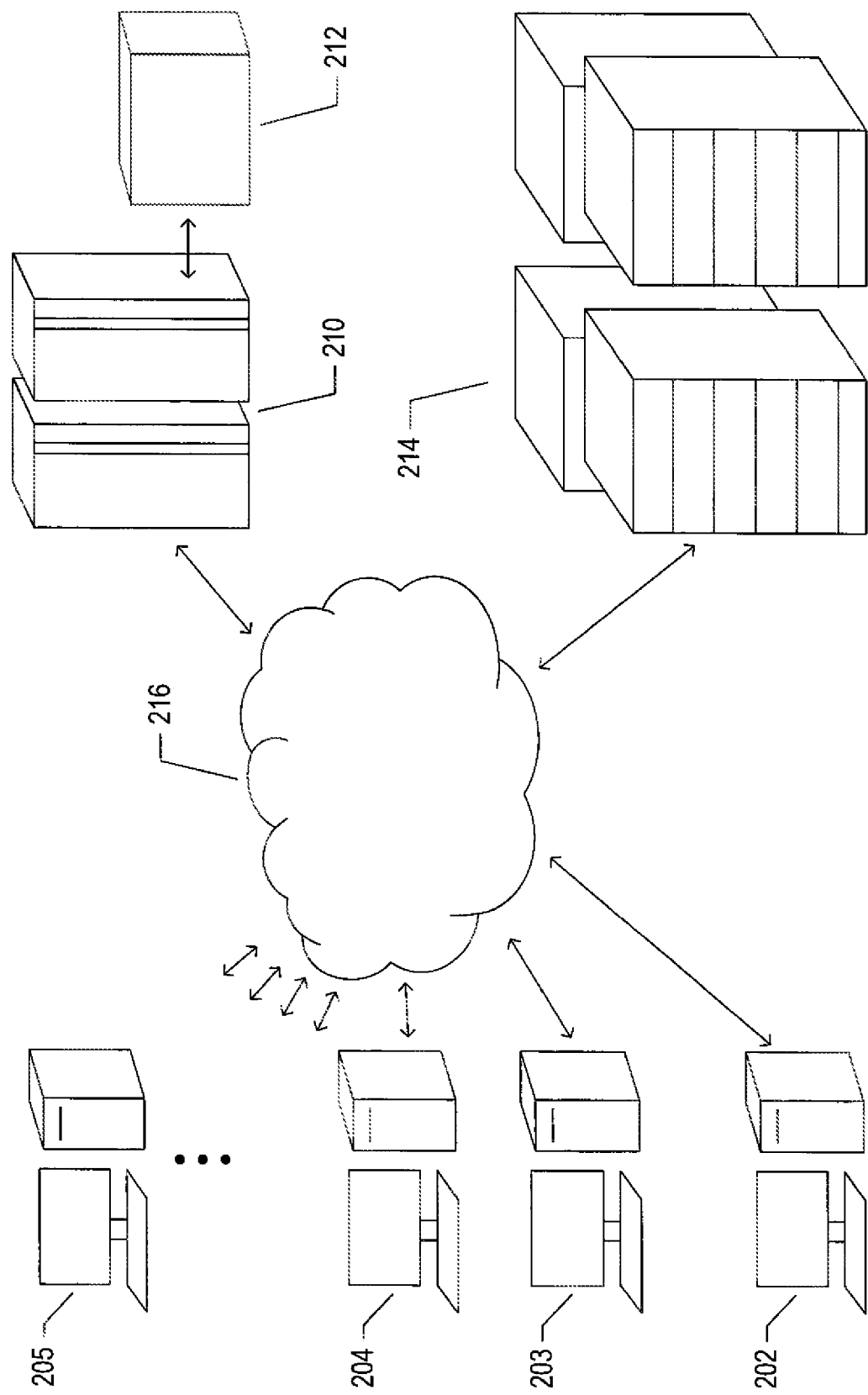
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
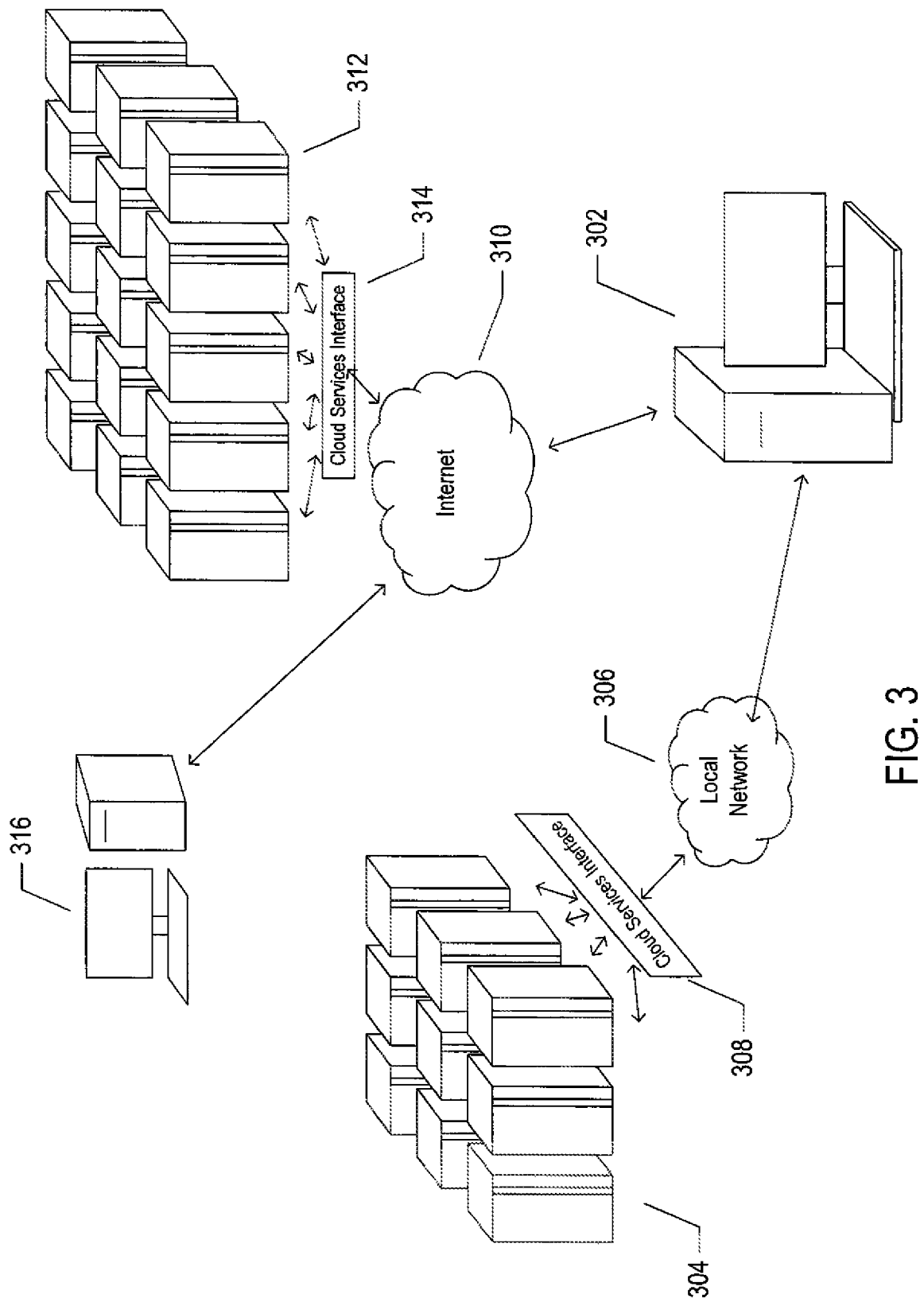
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
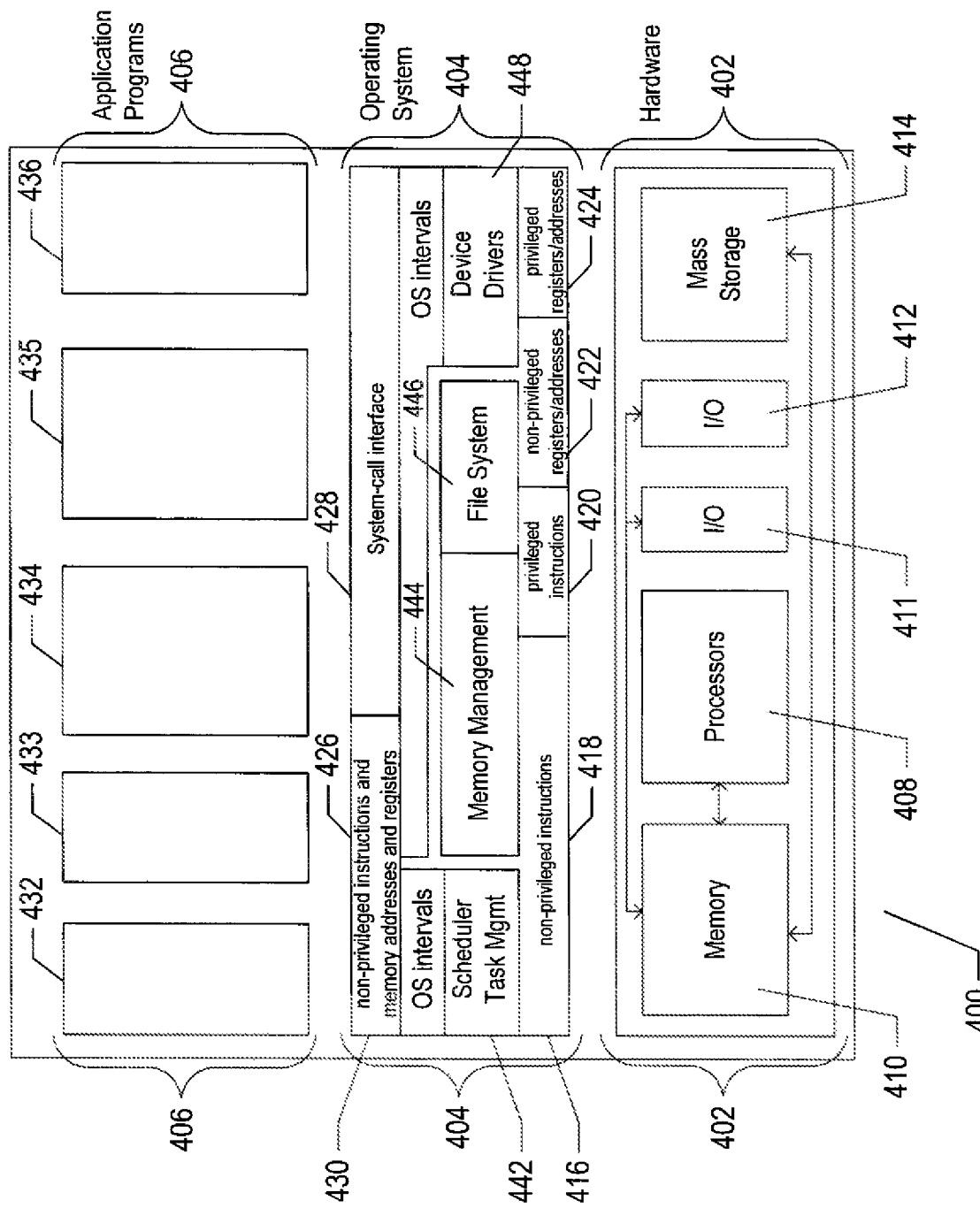
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 411 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
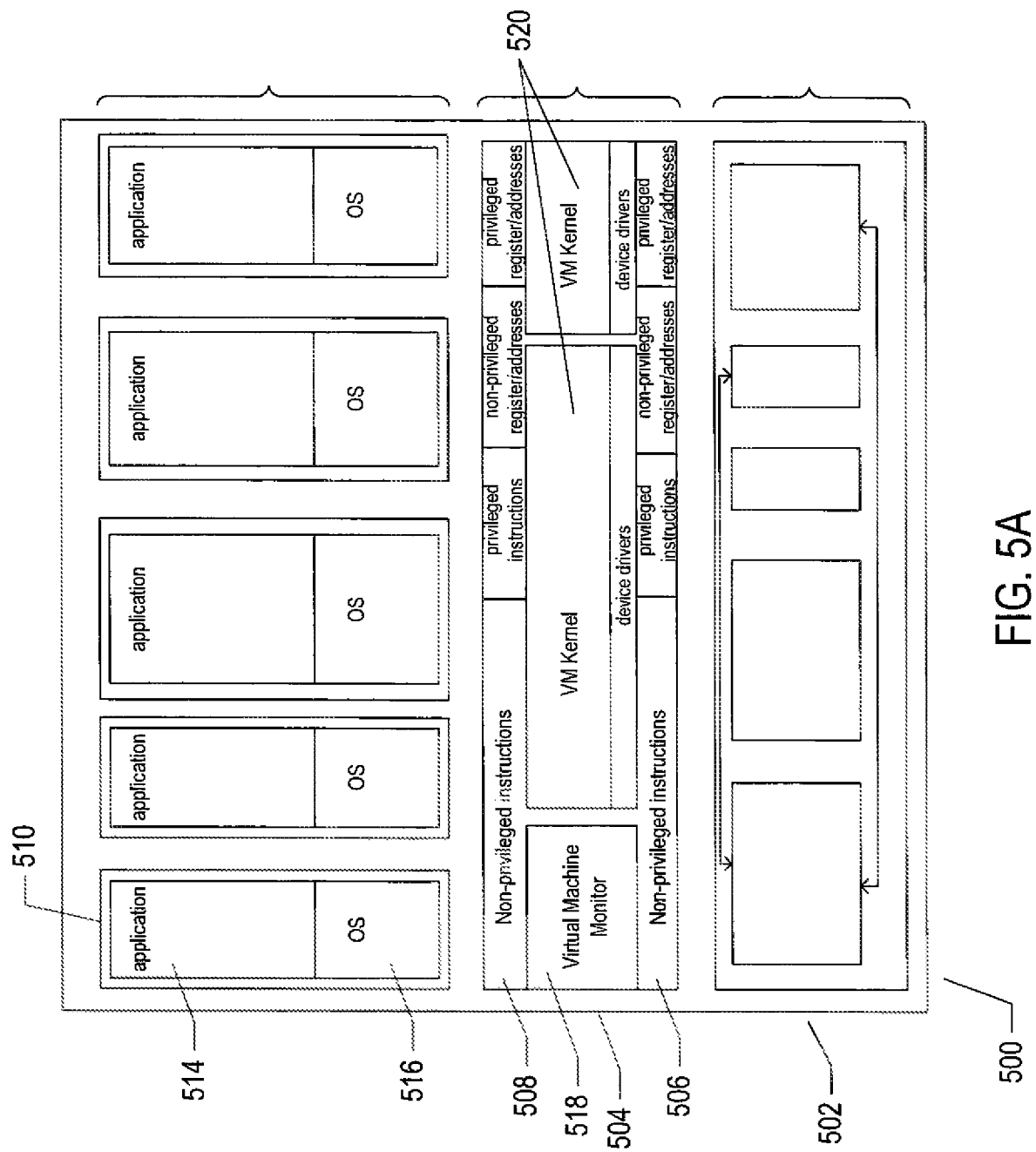
FIGS. 5A-B illustrate two types of virtual machine and virtual-machine execution environments.
Figure 5B:
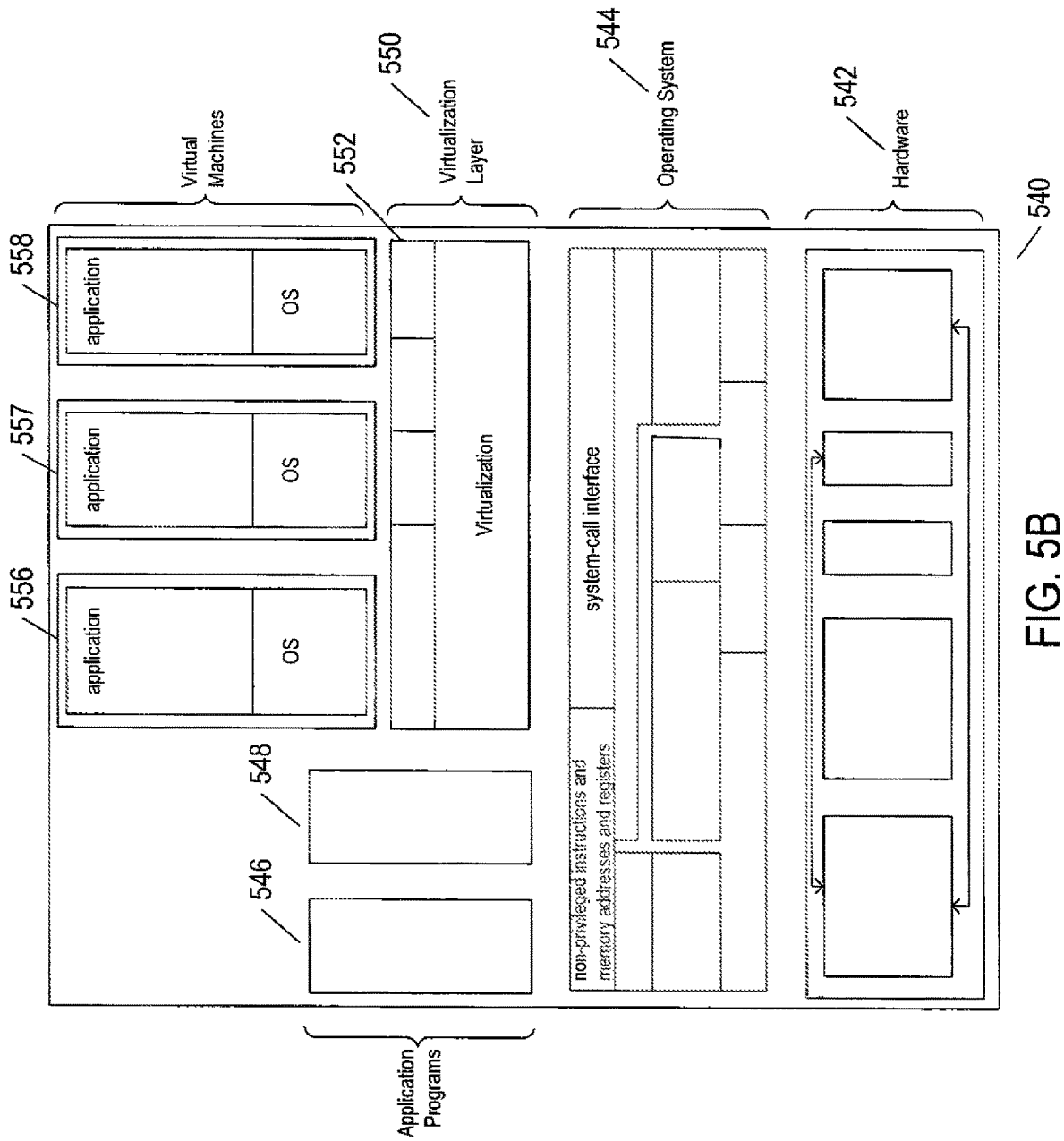

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides at execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
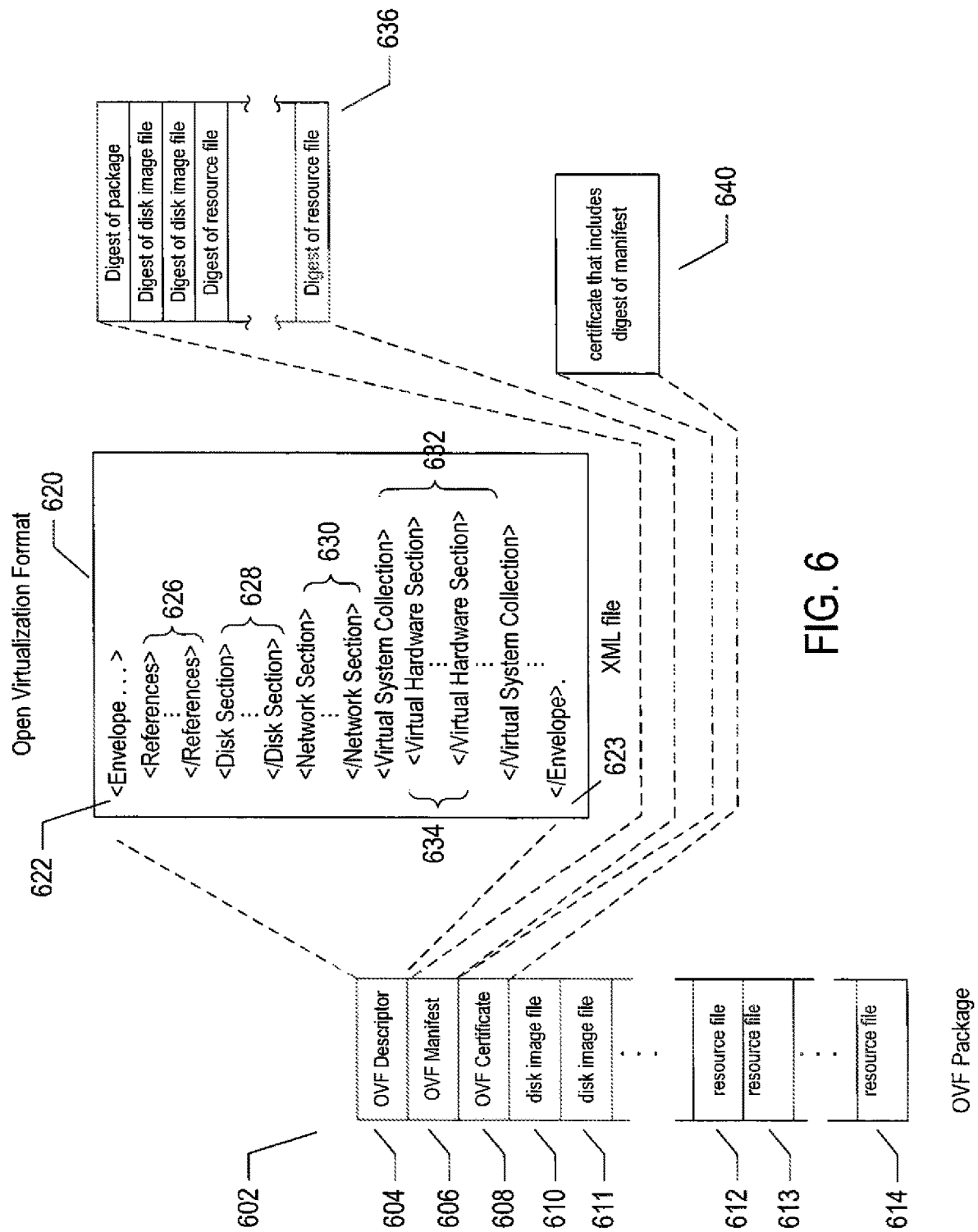
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
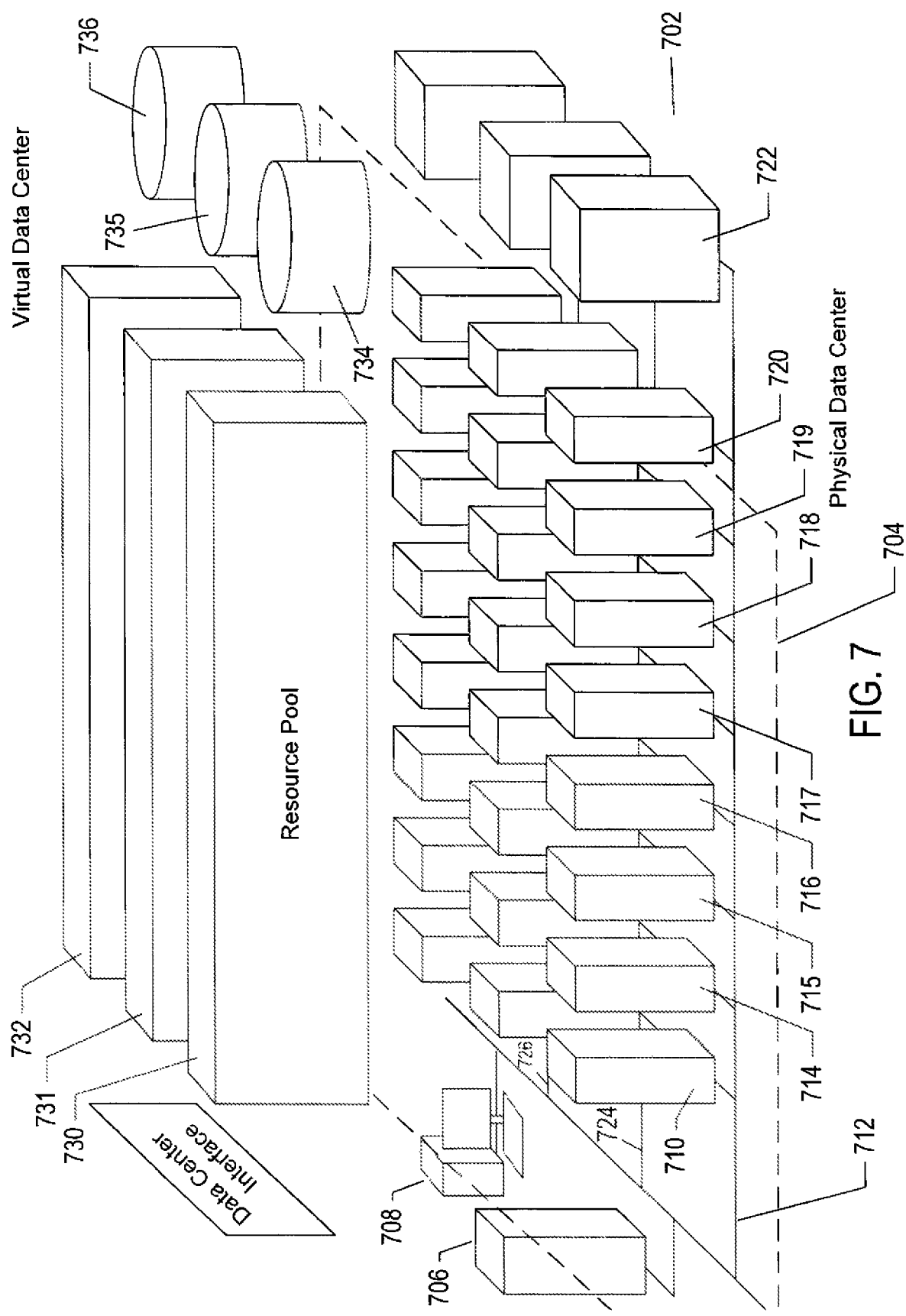
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the VI-management-server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability.

Figure 8:
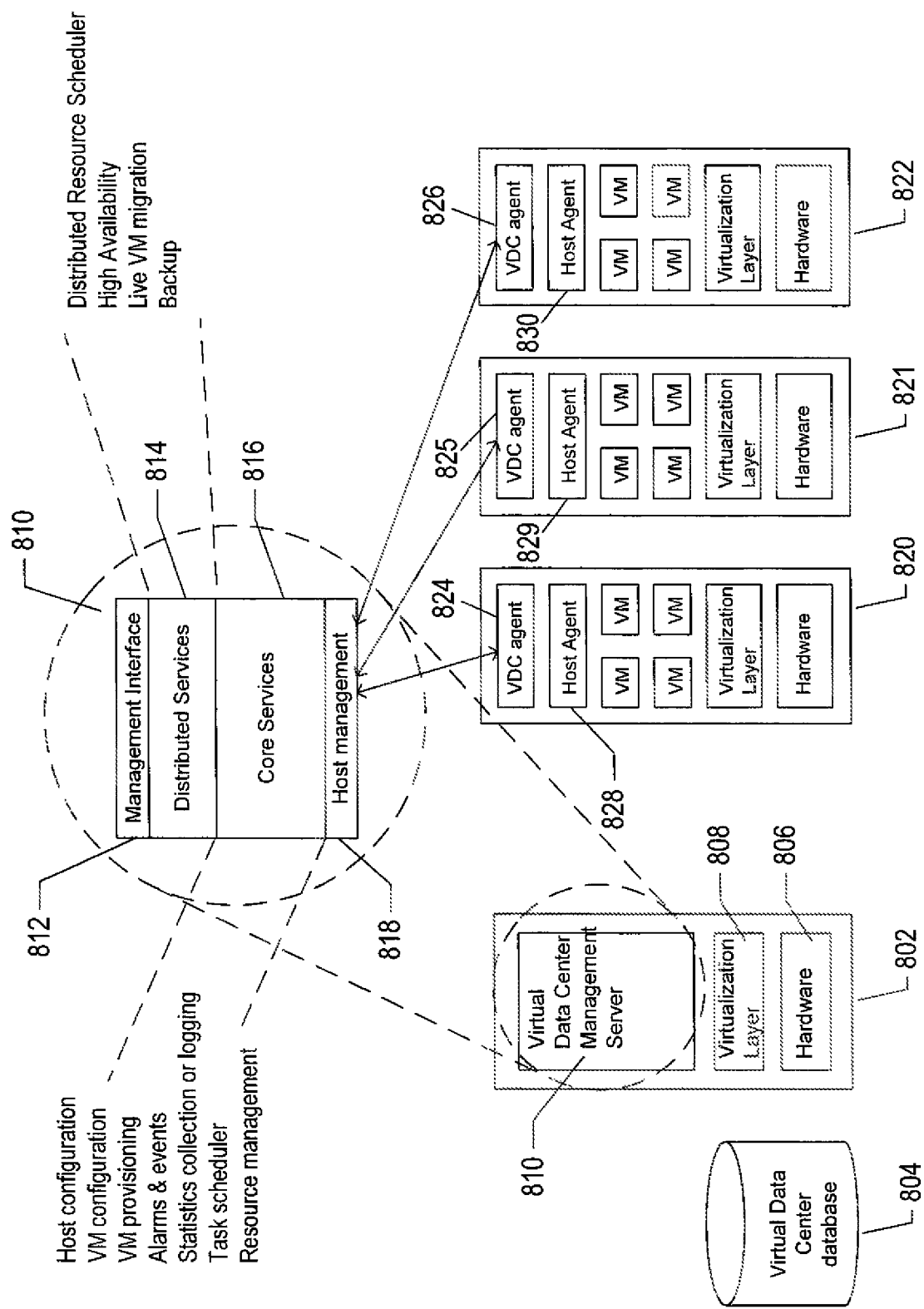
FIG. 8 illustrates virtual-machine components of a VI-management-server and physical servers of a physical data center above which a virtual-data-center interface is provided by the VI-management-server.

FIG. 8 illustrates virtual-machine components of a VI-management-server and physical servers of a physical data center above which a virtual-data-center interface is provided by the VI-management-server. The VI-management-server 802 and a virtual-data-center database 804 comprise the physical components of the management component of the virtual data center. The VI-management-server 802 includes a hardware layer 806 and virtualization layer 808, and runs a virtual-data-center management-server virtual machine 810 above the virtualization layer. Although shown as a single server in FIG. 8, the VI-management-server ("VI management server") may include two or more physical server computers that support multiple VI-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VI management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VI management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VI management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions virtual data centers ("VDCs") into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
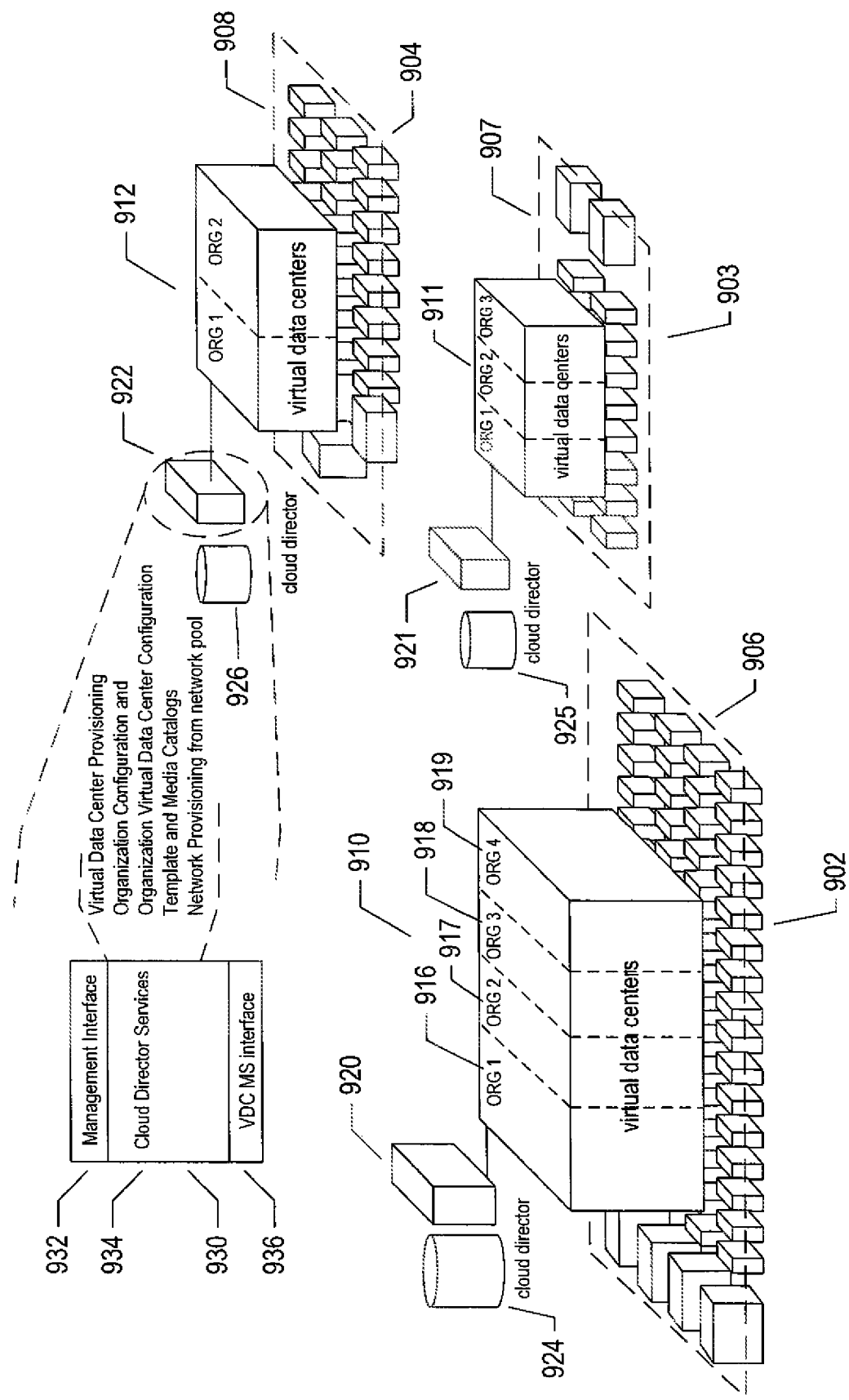
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 92C-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VI management server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
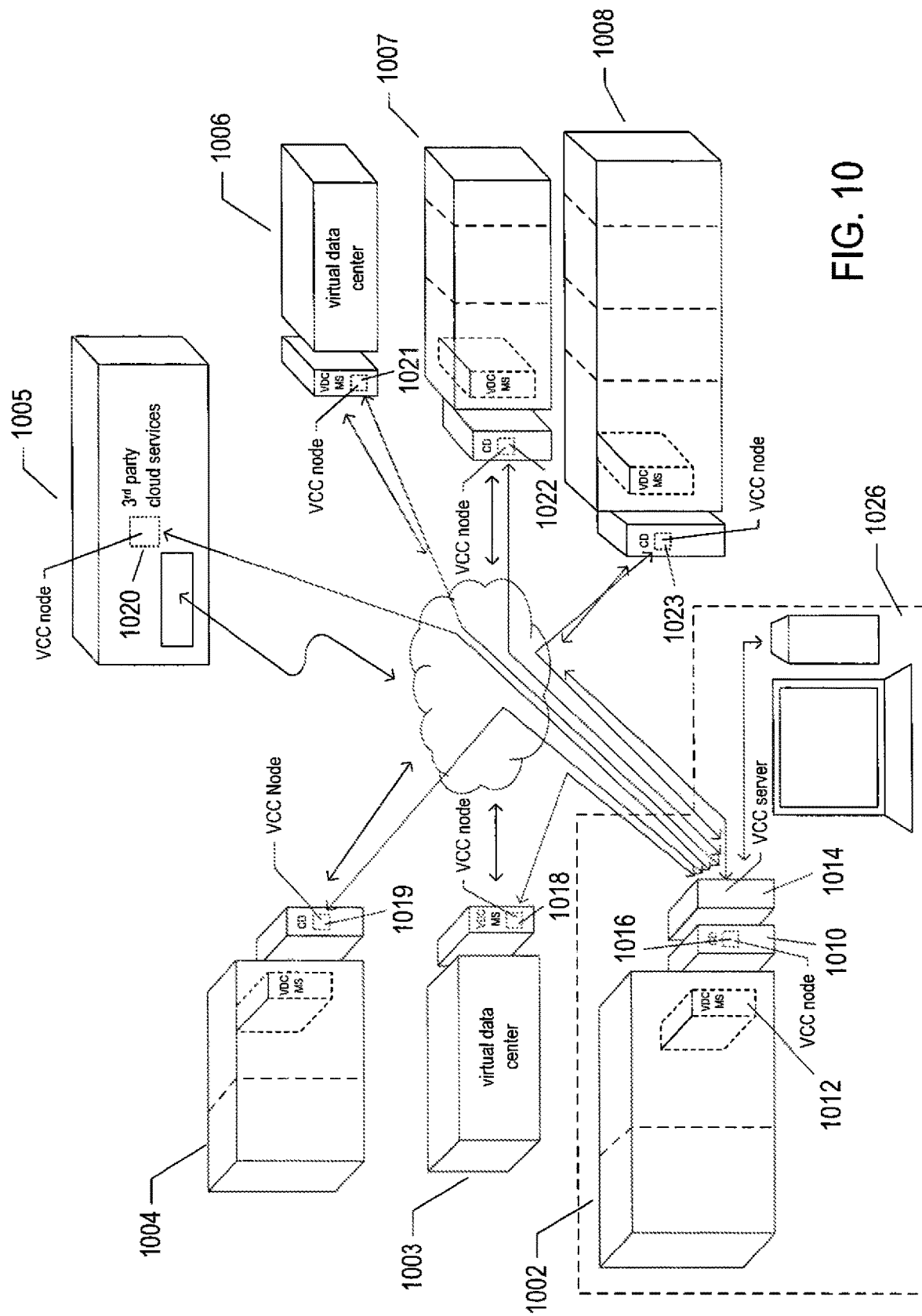
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VI management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VI management server that manages a single-tenant private cloud. The VCC server 1014 additionally interfaces, through the Internet, to VCC node virtual appliances executing within remote VI management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Figure 11:
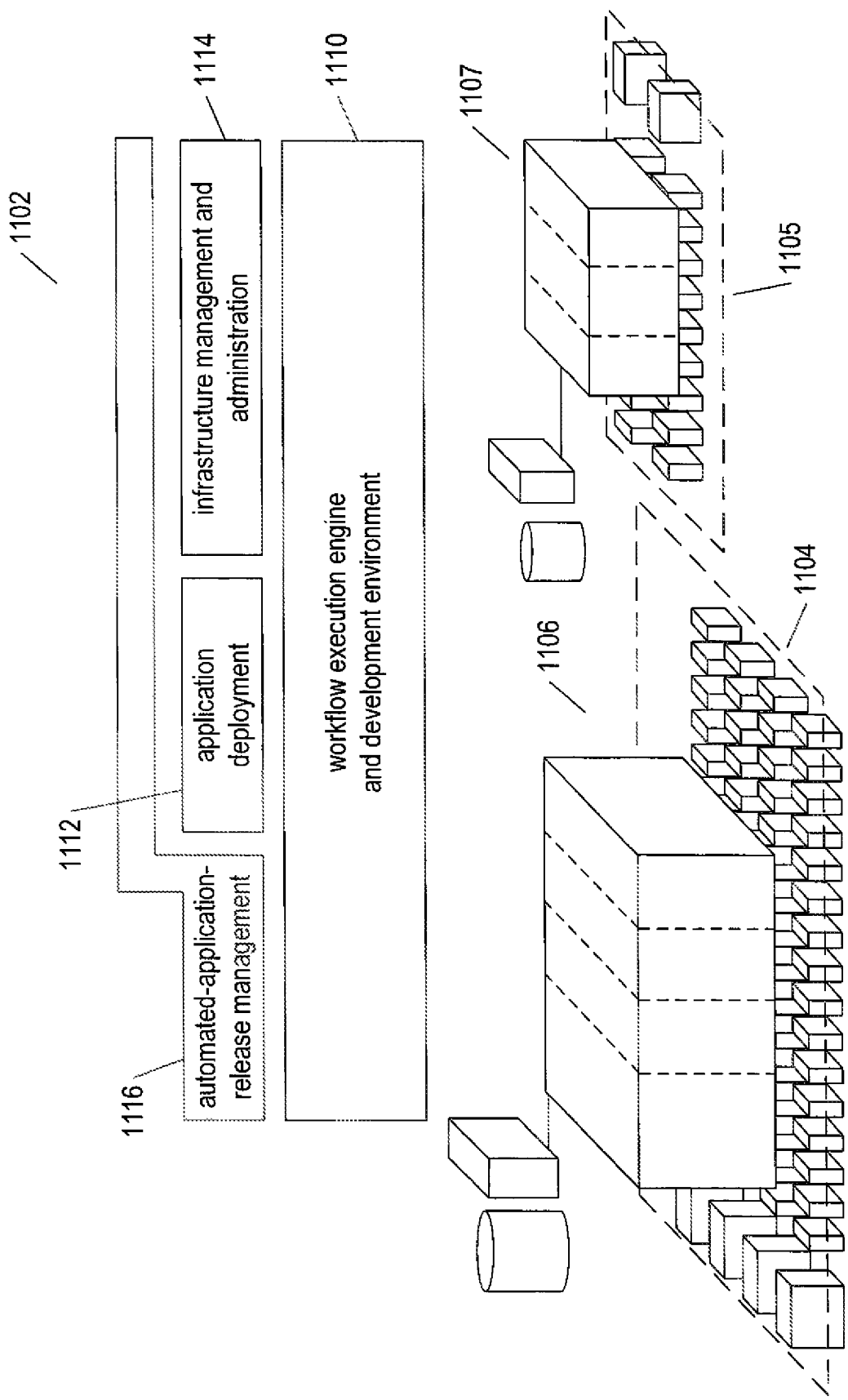
FIG. 11 shows a workflow-based cloud-management facility that has been developed to provide a powerful administrative and development interface to multiple multi-tenant cloud-computing facilities.

Workflow-Based Cloud Management Including an Automated-Application-Release-Management Subsystem FIG. 11 shows workflow-based cloud-management facility that has been developed to provide a powerful administrative and development interface to multiple multi-tenant cloud-computing facilities. The workflow-based management, administration, and development facility ("WFMAD") is used to manage and administer cloud-computing aggregations, such as those discussed above with reference to FIG. 10, cloud-computing aggregations, such as those discussed above with reference to FIG. 9, and a variety of additional types of cloud-computing facilities as well as to deploy applications and continuously and automatically release complex applications on various types of cloud-computing aggregations. As shown in FIG. 11, the WFMAD 1102 is implemented above the physical hardware layers 1104 and 1105 and virtual data centers 1106 and 1107 of a cloud-computing facility or cloud-computing-facility aggregation. The WFMAD includes a workflow-execution engine and development environment 1110, an application-deployment facility 1112, an infrastructure-management-and-administration facility 1114, and an automated-application-release-management facility 1116. The workflow-execution engine and development environment 1110 provides an integrated development environment for constructing, validating, testing, and executing graphically expressed workflows, discussed in detail below. Workflows are high-level programs with many built-in functions, scripting tools, and development tools and graphical interfaces. Workflows provide an underlying foundation for the infrastructure-management-and-administration facility 1114, the application-development facility 1112, and the automated-application-release-management facility 1116. The infrastructure-management-and-administration facility 1114 provides a powerful and intuitive suite of management and administration tools that allow the resources of a cloud-computing facility or cloud-computing-facility aggregation to be distributed among clients and users of the cloud-computing facility or facilities and to be administered by a hierarchy of general and specific administrators. The infrastructure-management-and-administration facility 1114 provides interfaces that allow service architects to develop various types of services and resource descriptions that can be provided to users and clients of the cloud-computing facility or facilities, including many management and administrative services and functionalities implemented as workflows. The application-deployment facility 1112 provides an integrated application-deployment environment to facilitate building and launching complex cloud-resident applications on the cloud-computing facility or facilities. The application-deployment facility provides access to one or more artifact repositories that store and logically organize binary files and other artifacts used to build complex cloud-resident applications as well as access to automated tools used, along with workflows, to develop specific automated application-deployment tools for specific cloud-resident applications. The automated-application-release-management facility 1116 provides workflow-based automated release-management tools that enable cloud-resident-application developers to continuously generate application releases produced by automated deployment, testing, and validation functionalities. Thus, the WFMAD 1102 provides a powerful, programmable, and extensible management, administration, and development platform to allow cloud-computing facilities and cloud-computing-facility aggregations to be used and managed by organizations and teams of individuals.

Figure 12:
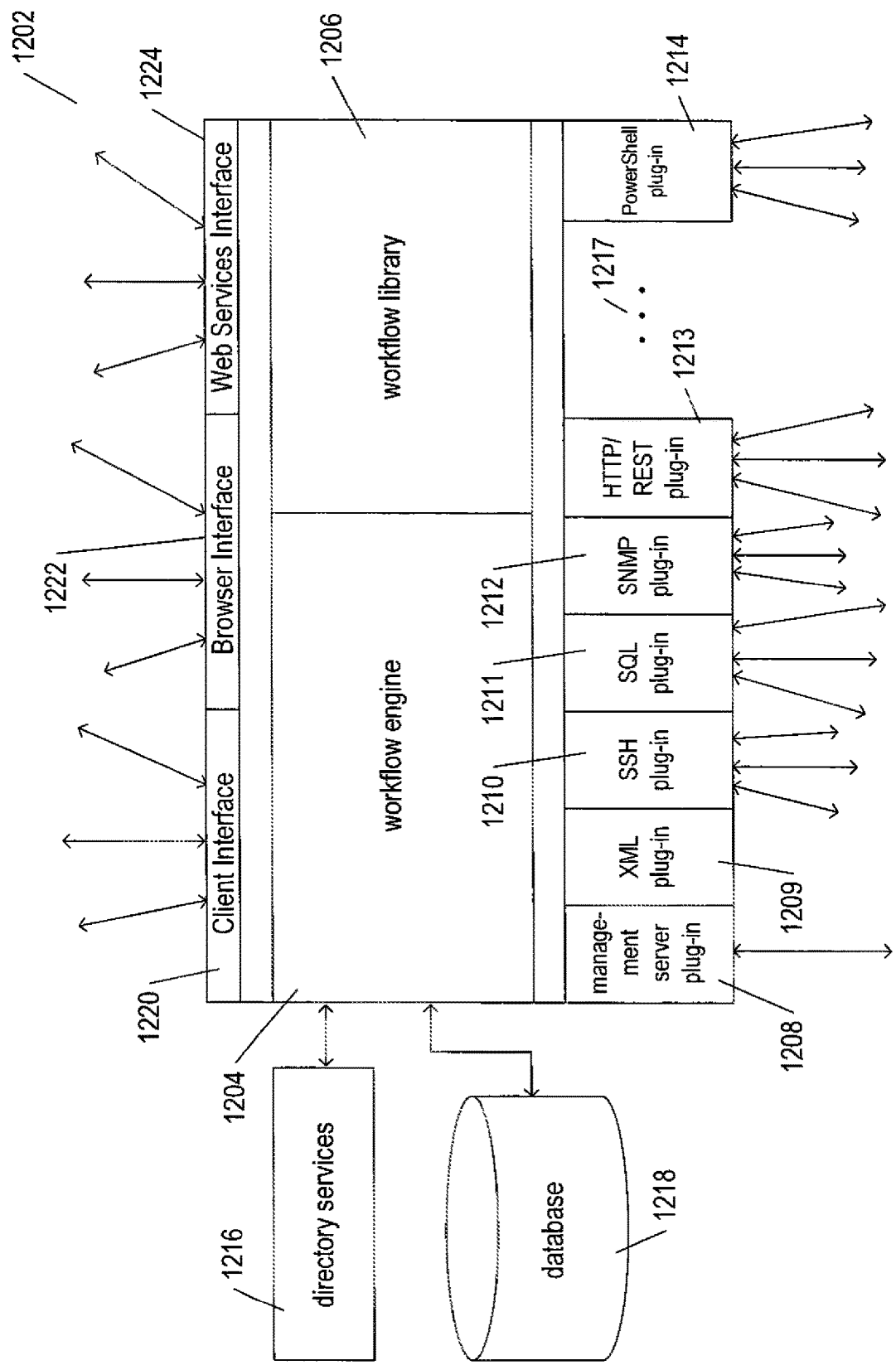
FIG. 12 provides an architectural diagram of the workflow-execution engine and development environment.

Next, the workflow-execution engine and development environment is discussed in greater detail. FIG. 12 provides an architectural diagram of the workflow-execution engine and development environment. The workflow-execution engine and development environment 1202 includes a workflow engine 1204, which executes workflows to carry out the many different administration, management, and development tasks encoded in workflows that comprise the functionalities of the WFMAD. The workflow engine, during execution of workflows, accesses many built-in tools and functionalities provided by a workflow library 1206. In addition, both the routines and functionalities provided by the workflow library and the workflow engine access a wide variety of tools and computational facilities, provided by a wide variety of third-party providers, through a large set of plug-ins 1208-1214. Note that the ellipses 1216 indicate that many additional plug-ins provide, to the workflow engine and workflow-library routines, access to many additional third-party computational resources. Plug-in 1208 provides for access, by the workflow engine and workflow-library routines, to a cloud-computing-facility or cloud-computing-facility-aggregation management server, such as a cloud director (920 in FIG. 9) or VCC server (1014 in FIG. 10). The XML plug-in 1209 provides access to a complete document object model ("DOM") extensible markup language ("XML") parser. The SSH plug-in 1210 provides access to an implementation of the Secure Shell v2 ("SSH-2") protocol. The structured query language ("SQL") plug-in 1211 provides access to a Java database connectivity ("JDBC") API that, in turn, provides access to a wide range of different types of databases. The simple network management protocol ("SNMP") plug-in 1212 provides access to an implementation of the SNMP protocol that allows the workflow-execution engine and development environment to connect to, and receive information from, various SNMP-enabled systems and devices. The hypertext transfer protocol ("HTTP")/representational state transfer ('REST") plug-in 1213 provides access to REST web services and hosts. The PowerShell plug-in 1214 allows the workflow-execution engine and development environment to manage PowerShell hosts and run custom PowerShell operations. The workflow engine 1204 additionally accesses directory services 1216, such as a lightweight directory access protocol ("LDAP") directory, that maintain distributed directory information and manages password-based user login. The workflow engine also accesses a dedicated database 1218 in which workflows and other information are stored. The workflow-execution engine and development environment can be accessed by clients running a client application that interfaces to a client interface 1220, by clients using web browsers that interface to a browser interface 1222, and by various applications and other executables running on remote computers that access the workflow-execution engine and development environment using a REST or small-object-access protocol ("SOAP") via a web-services interface 1224. The client application that runs on a remote computer and interfaces to the client interface 1220 provides a powerful graphical user interface that allows a client to develop and store workflows for subsequent execution by the workflow engine. The user interface also allows clients to initiate workflow execution and provides a variety of tools for validating and debugging workflows. Workflow execution can be initiated via the browser interface 1222 and web-services interface 1224. The various interfaces also provide for exchange of data output by workflows and input of parameters and data to workflows. Note that, by "third-party," the current document refers to programs and other computational resources provided by computer systems external to a subject system, such as the workflow-based cloud-management facility, that uses the programs and other computational resources, where the external system is owned and managed by one or more third parties different from the one or more owners and managers of the subject system.

Figure 13A:
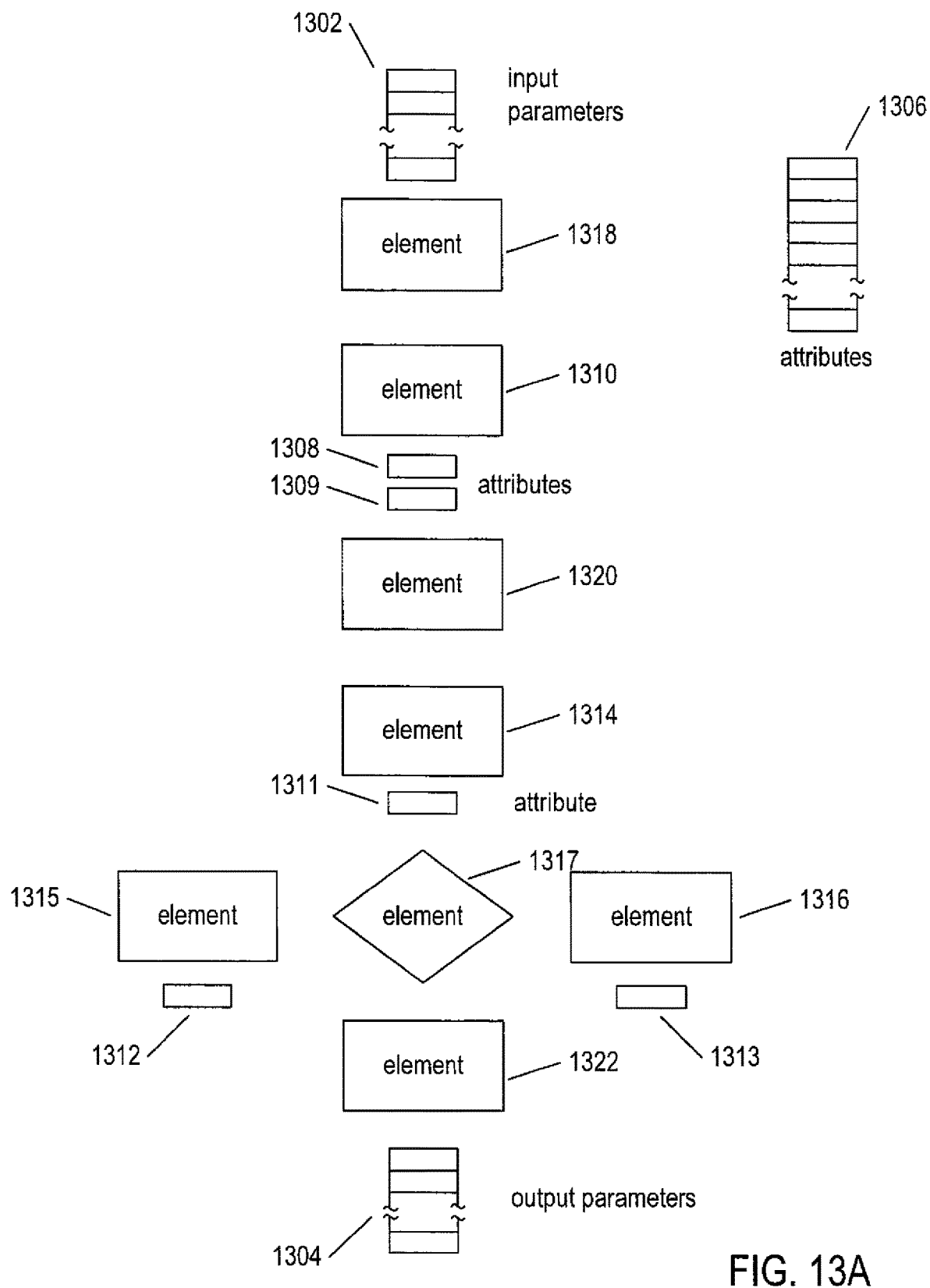
FIGS. 13A-C illustrate the structure of a workflow.
Figure 13B:
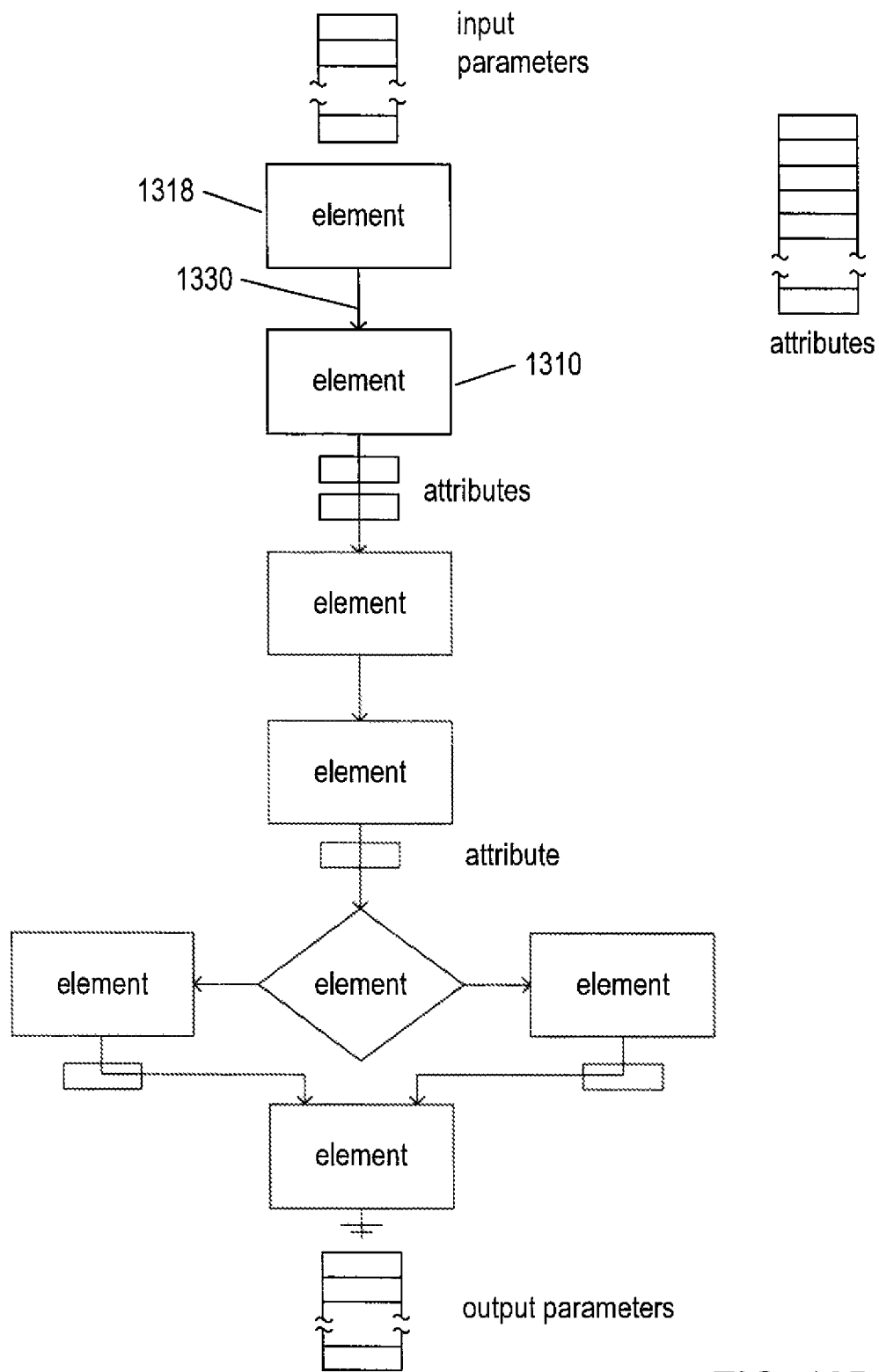
Figure 13C:
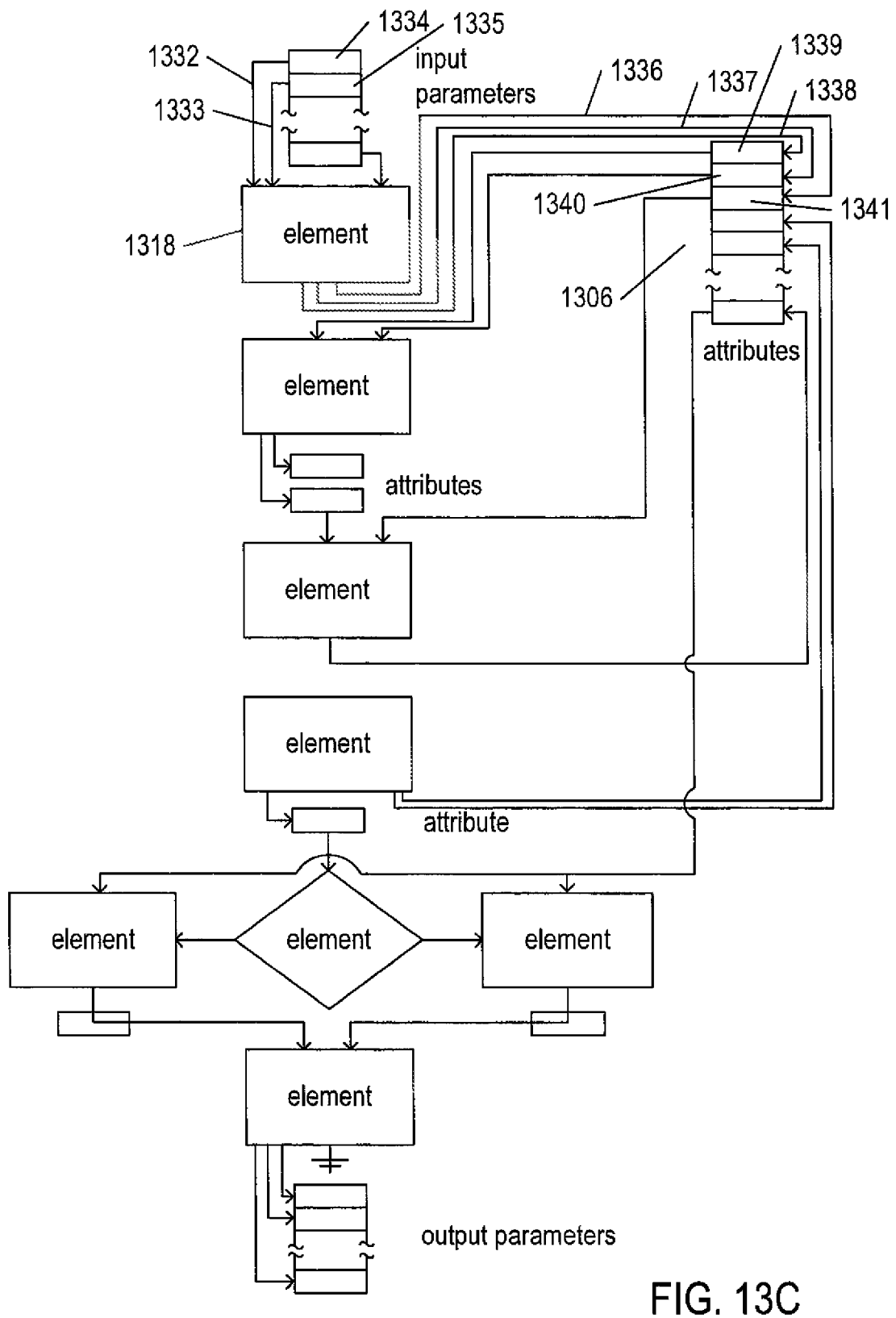

FIGS. 13A-C illustrate the structure of a workflow. A workflow is a graphically represented high-level program. FIG. 13A shows the main logical components of a workflow. These components include a set of one or more input parameters 1302 and a set of one or more output parameters 1304. In certain cases, a workflow may not include input and/or output parameters, but, in general, both input parameters and output parameters are defined for each workflow. The input and output parameters can have various different data types, with the values for a parameter depending on the data type associated with the parameter. For example, a parameter may have a string data type, in which case the values for the parameter can include any alphanumeric string or Unicode string of up to a maximum length. A workflow also generally includes a set of parameters 1306 that store values manipulated during execution of the workflow. This set of parameters is similar to a set of global variables provided by many common programming languages. In addition, attributes can be defined within individual elements of a workflow, and can be used to pass values between elements. In FIG. 13A, for example, attributes 1308-1309 are defined within element 1310 and attributes 1311, 1312, and 1313 are defined within elements 1314, 1315, and 1316, respectively. Elements, such as elements 1318, 1310, 1320, 1314-1316, and 1322 in FIG. 13A, are the execution entities within a workflow. Elements are equivalent to one or a combination of common constructs in programming languages, including subroutines, control structures, error handlers, and facilities for launching asynchronous and synchronous procedures. Elements may correspond to script routines, for example, developed to carry out an almost limitless number of different computational tasks. Elements are discussed, in greater detail, below.

As shown in FIG. 13B, the logical control flow within a workflow is specified by links, such as link 1330 which indicates that element 1310 is executed following completion of execution of element 1318. In FIG. 13B, links between elements are represented as single-headed arrows. Thus, links provide the logical ordering that is provided, in a common programming language, by the sequential ordering of statements. Finally, as shown in FIG. 13C, bindings that bind input parameters, output parameters, and attributes to particular roles with respect to elements specify the logical data flow in a workflow. In FIG. 13C, single-headed arrows, such as single-headed arrow 1332, represent bindings between elements and parameters and attributes. For example, bindings 1332 and 1333 indicate that the values of the first input parameters 1334 and 1335 are input to element 1318. Thus, the first two input parameters 1334-1335 play similar roles as arguments to functions in a programming language. As another example, the bindings represented by arrows 1336-1338 indicate that element 1318 outputs values that are stored in the first three attributes 1339, 1340, and 1341 of the set of attributes 1306.

Thus, a workflow is a graphically specified program, with elements representing executable entities, links representing logical control flow, and bindings representing logical data flow. A workflow can be used to specific arbitrary and arbitrarily complex logic, in a similar fashion as the specification of logic by a compiled, structured programming language, an interpreted language, or a script language.

FIGS. 14A-B include a table of different types of elements that may be included in a workflow. Workflow elements may include a start-workflow element 1402 and an end-workflow element 1404, examples of which include elements 1318 and 1322, respectively, in FIG. 13A. Decision workflow elements 1406-1407, an example of which is element 1317 in FIG. 13A, function as an if-then-else construct commonly provided by structured programming languages. Scriptable-task elements 1408 are essentially script routines included in a workflow. A user-interaction element 1410 solicits input from a user during workflow execution. Waiting-timer and waiting-event elements 1412-1413 suspend workflow execution for a specified period of time or until the occurrence of a specified event. Thrown-exception elements 1414 and error-handling elements 1415-1416 provide functionality commonly provided by throw-catch constructs in common programming languages. A switch element 1418 dispatches control to one of multiple paths, similar to switch statements in common programming languages, such as C and C++. A foreach element 1420 is a type of iterator. External workflows can be invoked from a currently executing workflow by a workflow element 1422 or asynchronous-workflow element 1423. An action element 1424 corresponds to a call to a workflow-library routine. A workflow-note element 1426 represents a comment that can be included within a workflow. External workflows can also be invoked by schedule-workflow and nested-workflows elements 1428 and 1429.

Figure 15A:
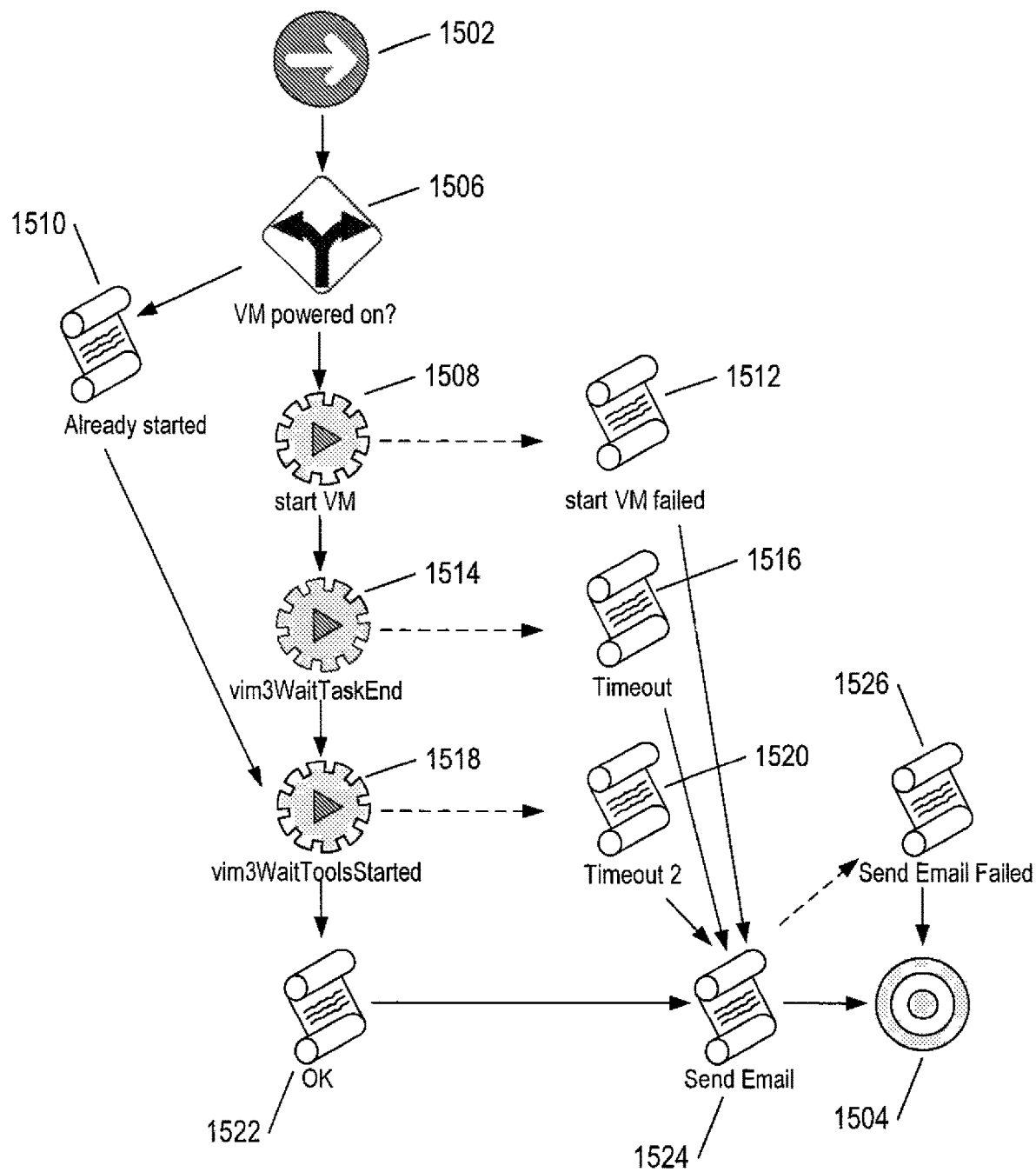
FIGS. 15A-B show an example workflow.
Figure 15B:
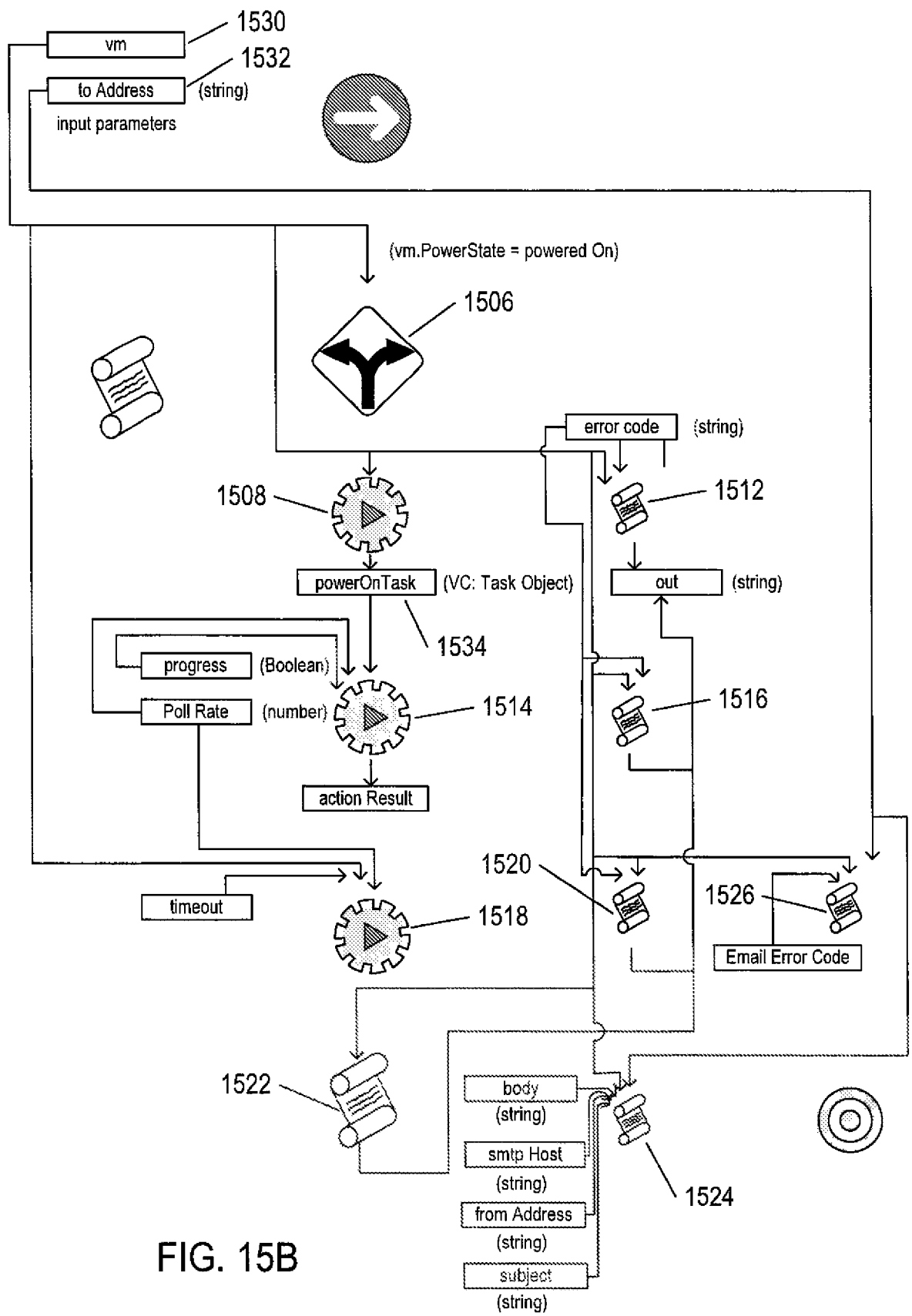

FIGS. 15A-B show an example workflow. The workflow shown in FIG. 15A is a virtual-machine-starting workflow that prompts a user to select a virtual machine to start and provides an email address to receive a notification of the outcome of workflow execution. The prompts are defined as input parameters. The workflow includes a start-workflow element 1502 and an end-workflow element 1504. The decision element 1506 checks to see whether or not the specified virtual machine is already powered on. When the VM is not already powered on, control flows to a start-VM action 1508 that calls a workflow-library function to launch the VM. Otherwise, the fact that the VM was already powered on is logged, in an already-started scripted element 1510. When the start operation fails, a start-VM-failed scripted element 1512 is executed as an exception handler and initializes an email message to report the failure. Otherwise, control flows to a vim3WaitTaskEnd action element 1514 that monitors the VM-starting task. A timeout exception handler is invoked when the start-VM task does not finish within a specified time period. Otherwise, control flows to a vim3WaitToolsStarted task 1518 which monitors starting of a tools application on the virtual machine. When the tools application fails to start, then a second timeout exception handler is invoked 1520. When all the tasks successfully complete, an OK scriptable task 1522 initializes an email body to report success. The email that includes either an error message or a success message is sent in the send-email scriptable task 1524. When sending the email fails, an email exception handler 1526 is called. The already-started, OK, and exception-handler scriptable elements 1510, 1512, 1516, 1520, 1522, and 1526 all log entries to a log file to indicate various conditions and errors. Thus, the workflow shown in FIG. 15A is a simple workflow that allows a user to specify a VM for launching to run an application.

FIG. 15B shows the parameter and attribute bindings for the workflow shown in FIG. 15A. The VM to start and the address to send the email are shown as input parameters 1530 and 1532. The VM to start is input to decision element 1506, start-VM action element 1508, the exception handlers 1512, 1516, 1520, and 1526, the send-email element 1524, the OK element 1522, and the vim3WaitToolsStarted element 1518. The email address furnished as input parameter 1532 is input to the email exception handler 1526 and the send-email element 1524. The VM-start task 1508 outputs an indication of the power on task initiated by the element in attribute 1534 which is input to the vim3WaitTaskEnd action element 1514. Other attribute bindings, input, and outputs are shown in FIG. 15B by additional arrows.

Figure 16A:
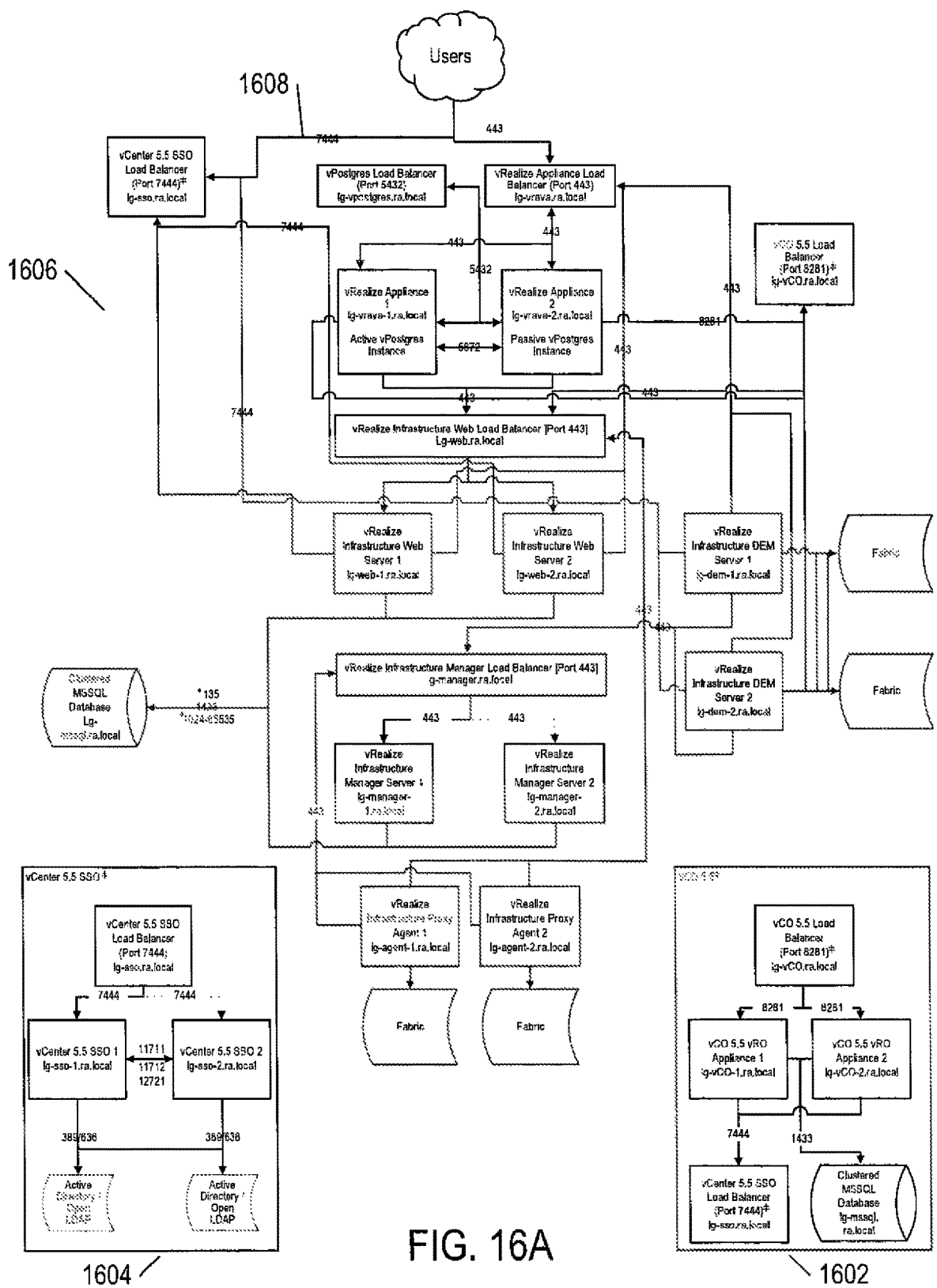

FIGS. 16A-C illustrate an example implementation and configuration of virtual appliances within a cloud-computing facility that implement the workflow-based management and administration facilities of the above-described WFMAD. FIG. 16A shows a configuration that includes the workflow-execution engine and development environment 1602, a cloud-computing facility 1604, and the infrastructure-management-and-administration facility 1606 of the above-described WFMAD. Data and information exchanges between components are illustrated with arrows, such as arrow 1608, labeled with port numbers indicating inbound and outbound ports used for data and information exchanges. FIG. 16B provides a table of servers, the services provided by the server, and the inbound and outbound ports associated with the server. Table 16C indicates the ports balanced by various load balancers shown in the configuration illustrated in FIG. 16A. It can be easily ascertained from FIGS. 16A-C that the WFMAD is a complex, multi-virtual-appliance/virtual-server system that executes on many different physical devices of a physical cloud-computing facility.

Figure 16D:
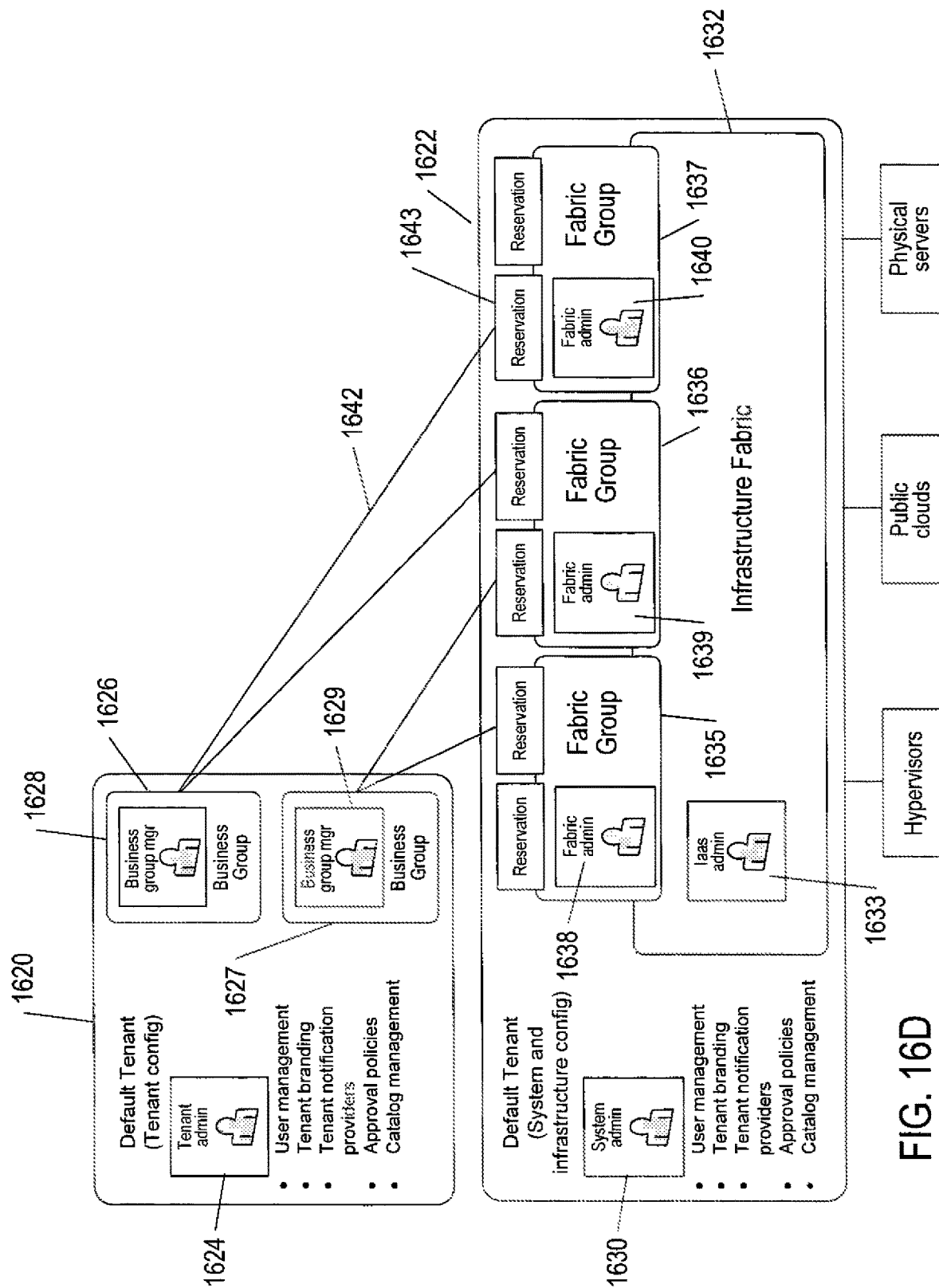
FIGS. 16D-F illustrate the logical organization of users and user roles with respect to the infrastructure-management-and-administration facility of the WFMAD.
Figure 16E:
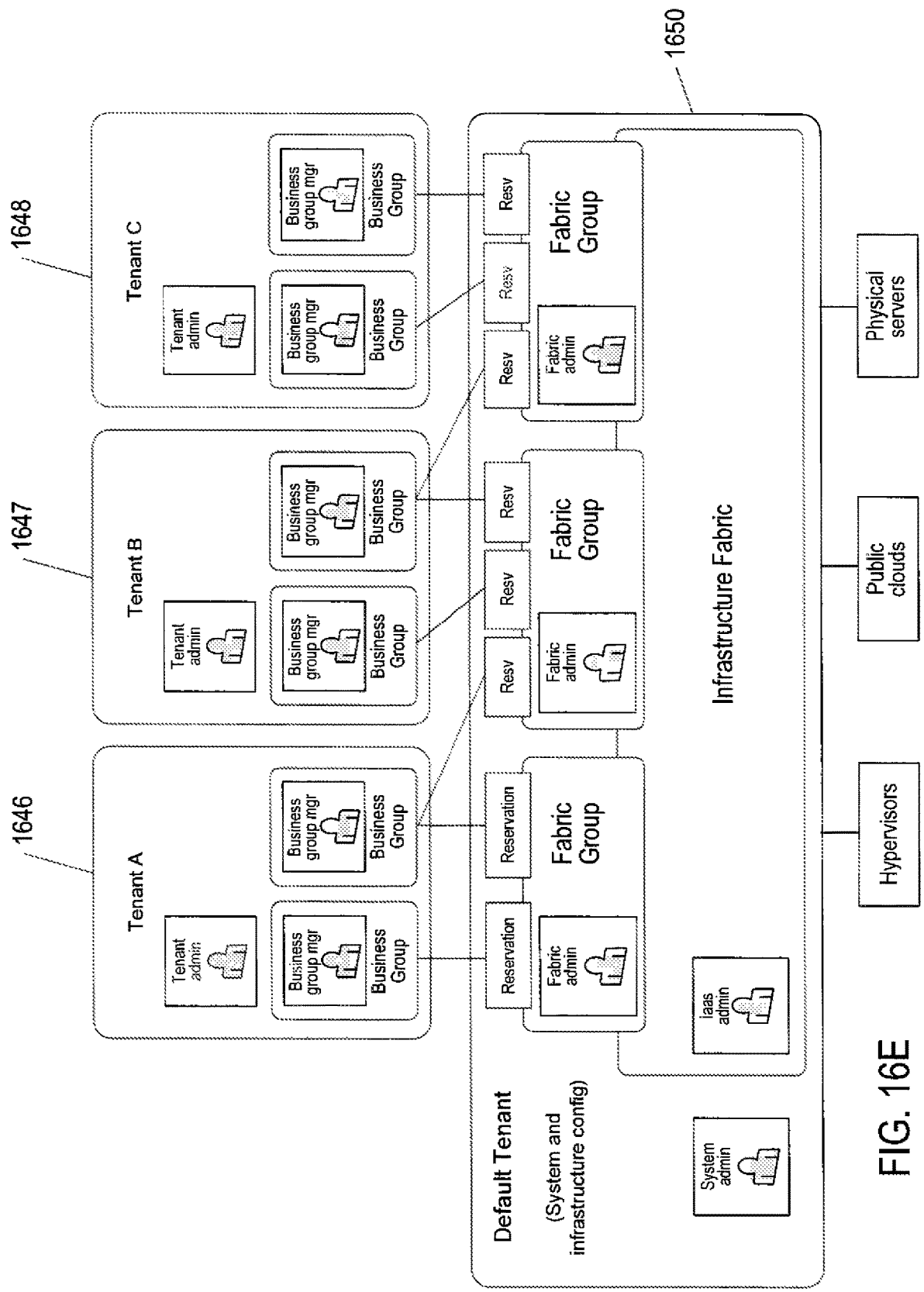
Figure 16F:
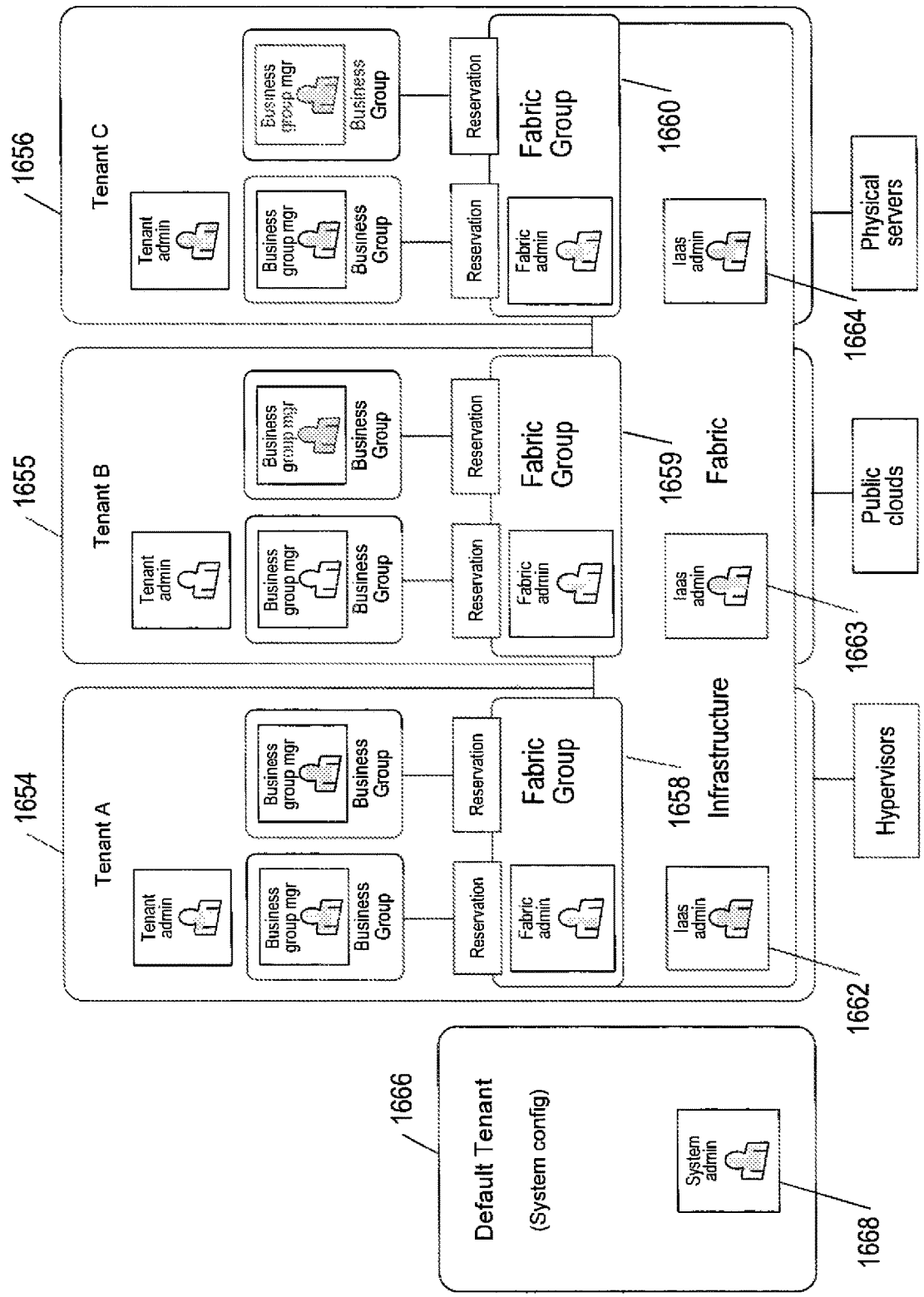

FIGS. 16D-F illustrate the logical organization of users and user roles with respect to the infrastructure-management-and-administration facility of the WFMAD (1114 in FIG. 11). FIG. 16D shows a single-tenant configuration, FIG. 16E shows a multi-tenant configuration with a single default-tenant infrastructure configuration, and FIG. 16F shows a multi-tenant configuration with a multi-tenant infrastructure configuration. A tenant is an organizational unit, such as a business unit in an enterprise or company that subscribes to cloud services from a service provider. When the infrastructure-management-and-administration facility is initially deployed within a cloud-computing facility or cloud-computing-facility aggregation, a default tenant is initially configured by a system administrator. The system administrator designates a tenant administrator for the default tenant as well as an identity store, such as an active-directory server, to provide authentication for tenant users, including the tenant administrator. The tenant administrator can then designate additional identity stores and assign roles to users or groups of the tenant, including business groups, which are sets of users that correspond to a department or other organizational unit within the organization corresponding to the tenant. Business groups are, in turn, associated with a catalog of services and infrastructure resources. Users and groups of users can be assigned to business groups. The business groups, identity stores, and tenant administrator are all associated with a tenant configuration. A tenant is also associated with a system and infrastructure configuration. The system and infrastructure configuration includes a system administrator and an infrastructure fabric that represents the virtual and physical computational resources allocated to the tenant and available for provisioning to users. The infrastructure fabric can be partitioned into fabric groups, each managed by a fabric administrator. The infrastructure fabric is managed by an infrastructure-as-a-service ("IAAS") administrator. Fabric-group computational resources can be allocated to business groups by using reservations.

FIG. 16D shows a single-tenant configuration for an infrastructure-management-and-administration facility deployment within a cloud-computing facility or cloud-computing-facility aggregation. The configuration includes a tenant configuration 1620 and a system and infrastructure configuration 1622. The tenant configuration 1620 includes a tenant administrator 1624 and several business groups 1626-1627, each associated with a business-group manager 1628-1629, respectively. The system and infrastructure configuration 1622 includes a system administrator 1630, an infrastructure fabric 1632 managed by an IAAS administrator 1633, and three fabric groups 1635-1637, each managed by a fabric administrator 1638-1640, respectively. The computational resources represented by the fabric groups are allocated to business groups by a reservation system, as indicated by the lines between business groups and reservation blocks, such as line 1642 between reservation block 1643 associated with fabric group 1637 and the business group 1626.

FIG. 16E shows a multi-tenant single-tenant-system-and-infrastructure-configuration deployment for an infrastructure-management-and-administration facility of the WFMAD. In this configuration, there are three different tenant organizations, each associated with a tenant configuration 1646-1648. Thus, following configuration of a default tenant, a system administrator creates additional tenants for different organizations that together share the computational resources of a cloud-computing facility or cloud-computing-facility aggregation. In general, the computational resources are partitioned among the tenants so that the computational resources allocated to any particular tenant are segregated from and inaccessible to the other tenants. In the configuration shown in FIG. 16E, there is a single default-tenant system and infrastructure configuration 1650, as in the previously discussed configuration shown in FIG. 16D.

FIG. 16F shows a multi-tenant configuration in which each tenant manages its own infrastructure fabric. As in the configuration shown in FIG. 16E, there are three different tenants 1654-1656 in the configuration shown in FIG. 16F. However, each tenant is associated with its own fabric group 1658-1660, respectively, and each tenant is also associated with an infrastructure-fabric IAAS administrator 1662-1664, respectively. A default-tenant system configuration 1666 is associated with a system administrator 1668 who administers the infrastructure fabric, as a whole.

System administrators, as mentioned above, generally install the WFMAD within a cloud-computing facility or cloud-computing-facility aggregation, create tenants, manage system-wide configuration, and are generally responsible for insuring availability of WFMAD services to users, in general. IAAS administrators create fabric groups, configure virtualization proxy agents, and manage cloud service accounts, physical machines, and storage devices. Fabric administrators manage physical machines and computational resources for their associated fabric groups as well as reservations and reservation policies through which the resources are allocated to business groups. Tenant administrators configure and manage tenants on behalf of organizations. They manage users and groups within the tenant organization, track resource usage, and may initiate reclamation of provisioned resources. Service architects create blueprints for items stored in user service catalogs which represent services and resources that can be provisioned to users. The infrastructure-management-and-administration facility defines many additional roles for various administrators and users to manage provision of services and resources to users of cloud-computing facilities and cloud-computing facility aggregations.

FIG. 17 illustrates the logical components of the infrastructure-management-and-administration facility (1114 in FIG. 11) of the WFMAD. As discussed above, the WFMAD is implemented within, and provides a management and development interface to, one or more cloud-computing facilities 1702 and 1704. The computational resources provided by the cloud-computing facilities, generally in the form of virtual servers, virtual storage devices, and virtual networks, are logically partitioned into fabrics 1706-1708. Computational resources are provisioned from fabrics to users. For example, a user may request one or more virtual machines running particular applications. The request is serviced by allocating the virtual machines from a particular fabric on behalf of the user. The services, including computational resources and workflow-implemented tasks, which a user may request provisioning of, are stored in a user service catalog such as user service catalog 1710, that is associated with particular business groups and tenants. In FIG. 17, the items within a user service catalog are internally partitioned into categories, such as the two categories 1712 and 1714 and separated logically by vertical dashed line 1716. User access to catalog items is controlled by entitlements specific to business groups. Business group managers create entitlements that specify which users and groups within the business group can access particular catalog items. The catalog items are specified by service-architect-developed blueprints, such as blueprint 1718 for service 1720. The blueprint is a specification for a computational resource or task-service and the service itself is implemented by a workflow that is executed by the workflow-execution engine on behalf of a user.

FIGS. 18-20B provide a high-level illustration of the architecture and operation of the automated-application-release-management facility (1116 in FIG. 11) of the WFMAD. The application-release management process involves storing, logically organizing, and accessing a variety of different types of binary files and other files that represent executable programs and various types of data that are assembled into complete applications that are released to users for running on virtual servers within cloud-computing facilities. Previously, releases of new version of applications may have occurred over relatively long time intervals, such as biannually, yearly, or at even longer intervals. Minor versions were released at shorter intervals. However, more recently, automated application-release management has provided for continuous release at relatively short intervals in order to provide new and improved functionality to clients as quickly and efficiently as possible.

Figure 18:
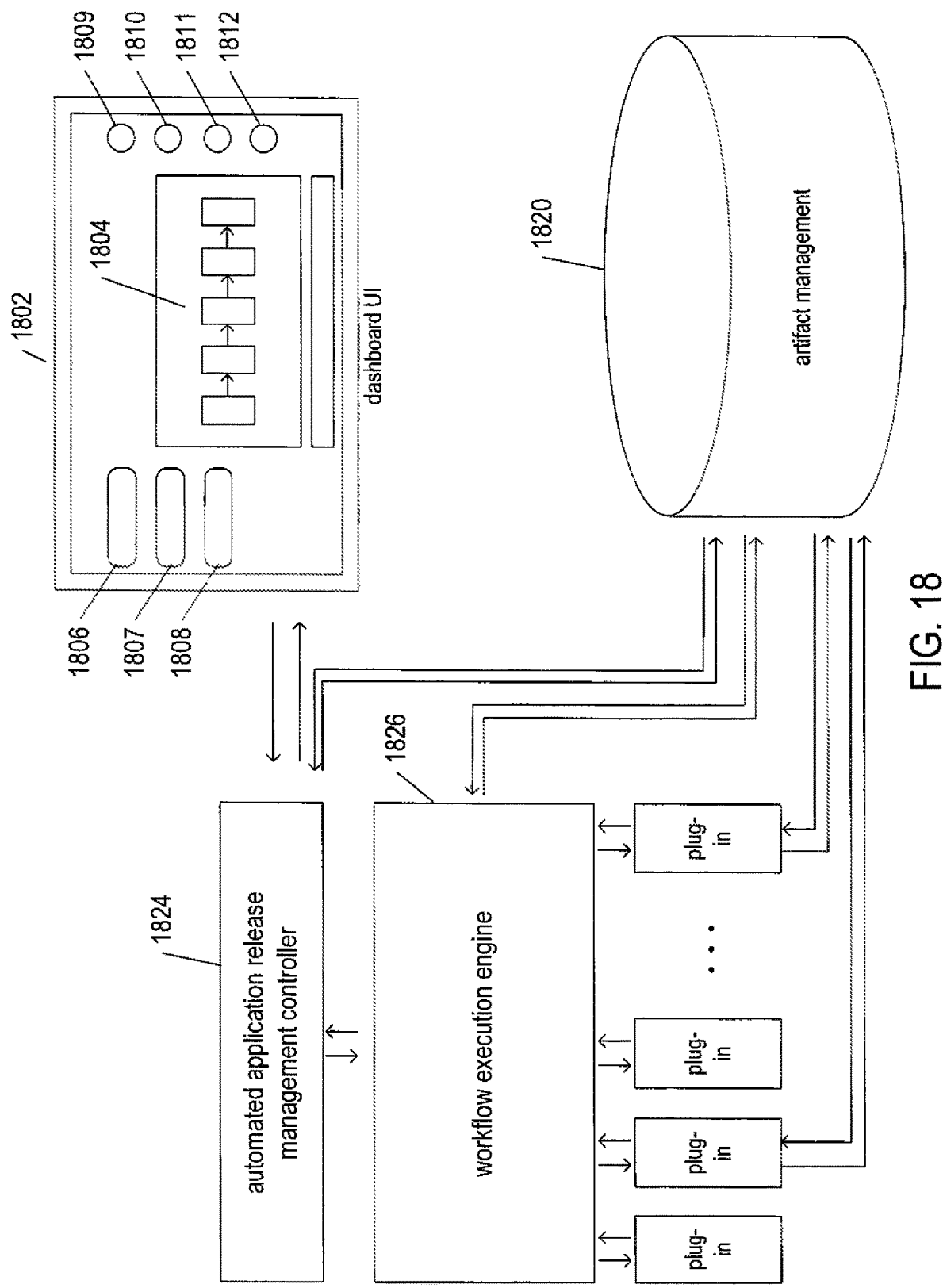
FIGS. 18-20B provide a high-level illustration of the architecture and operation of the automated-application-release-management facility of the WFMAD.

FIG. 18 shows main components of the automated-application-release-management facility (1116 in FIG. 11). The automated-application-release-management component provides a dashboard user interface 1802 to allow release managers and administrators to launch application-release-management pipelines ("release pipelines") and monitor their progress. The dashboard may visually display a graphically represented pipeline 1804 and provide various input features 1806-1812 to allow a release manager or administrator to view particular details about an executing pipeline, create and edit pipelines, launch pipelines, and generally manage and monitor the entire application-release process. The various binary files and other types of information needed to build and test applications are stored in an artifact-management component 1820. An automated-application-release-management controller 1824 sequentially initiates execution of various workflows that together implement a release pipeline and serves as an intermediary between the dashboard user interface 1802 and the workflow-execution engine 826.

Figure 19:
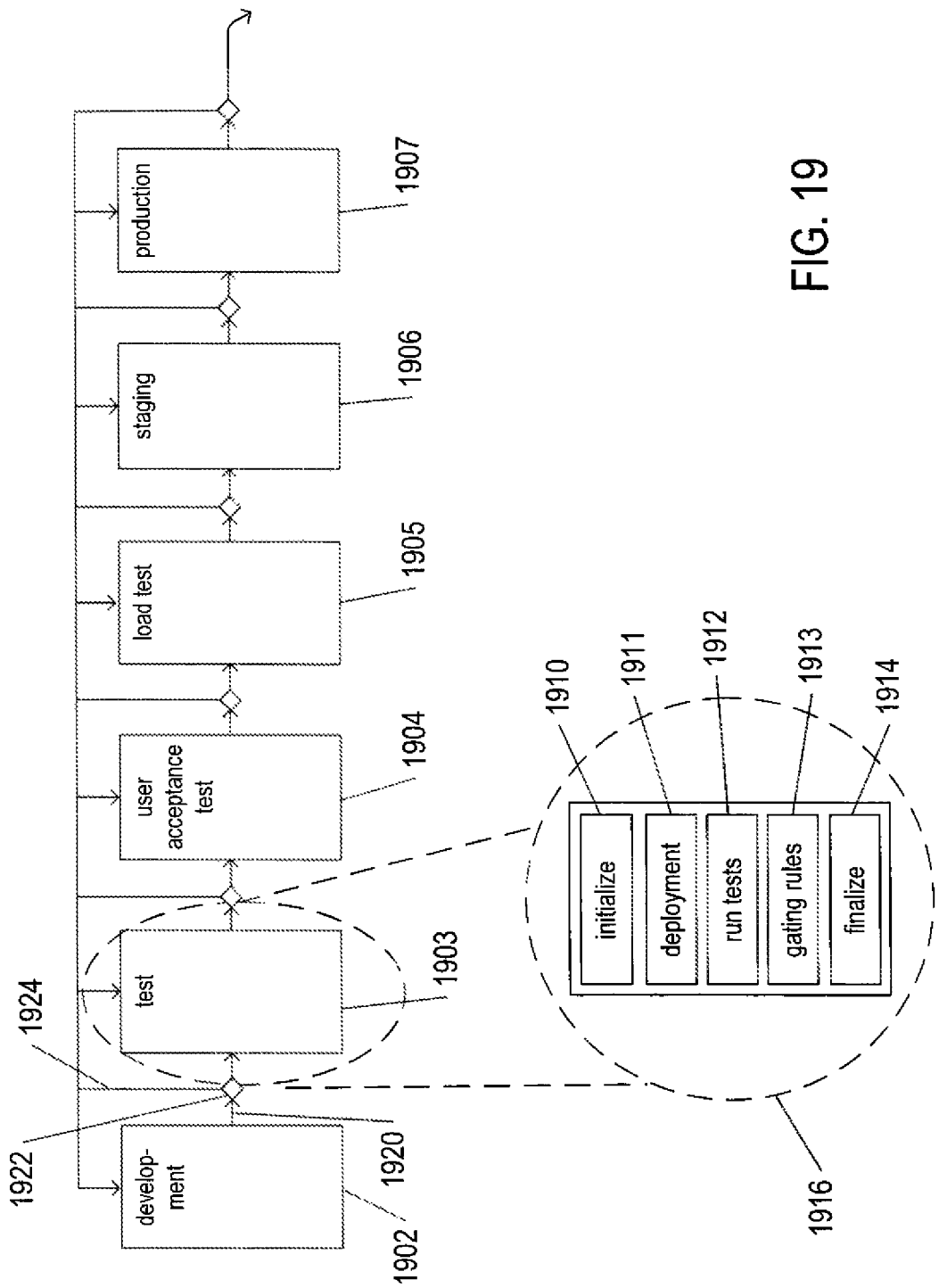

FIG. 19 illustrates a release pipeline. The release pipeline is a sequence of stages 1902-1907 that each comprises a number of sequentially executed tasks, such as the tasks 1910-1914 shown in inset 1916 that together compose stage 1903. In general, each stage is associated with gating rules that are executed to determine whether or not execution of the pipeline can advance to a next, successive stage. Thus, in FIG. 19, each stage is shown with an output arrow, such as output arrow 1920, that leads to a conditional step, such as conditional step 1922, representing the gating rules. When, as a result of execution of tasks within the stage, application of the gating rules to the results of the execution of the tasks indicates that execution should advance to a next stage, then any final tasks associated with the currently executing stage are completed and pipeline execution advances to a next stage. Otherwise, as indicated by the vertical lines emanating from the conditional steps, such as vertical line 1924 emanating from conditional step 1922, pipeline execution may return to re-execute the current stage or a previous stage, often after developers have supplied corrected binaries, missing data, or taken other steps to allow pipeline execution to advance.

Figure 20A:
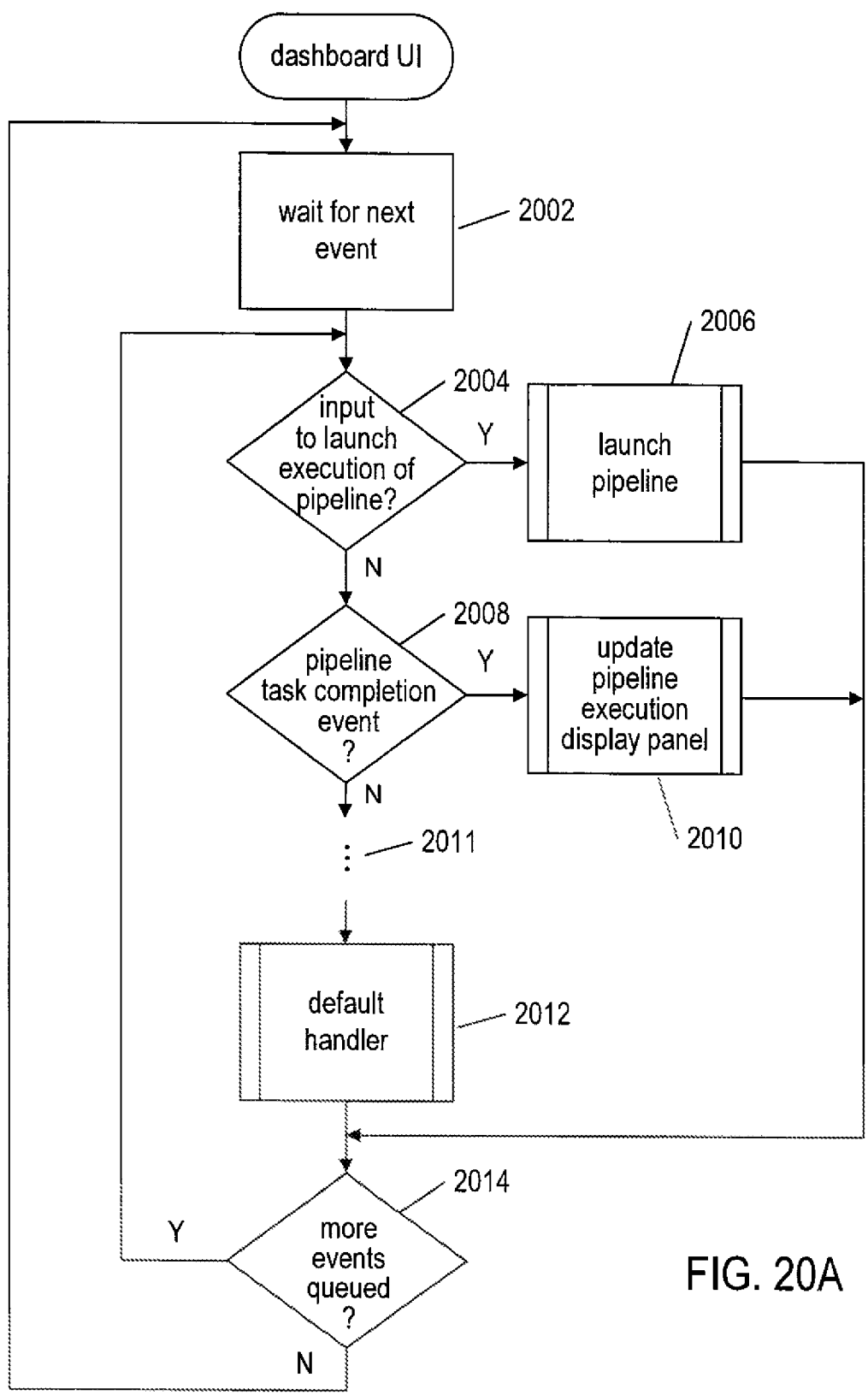
Figure 20B:
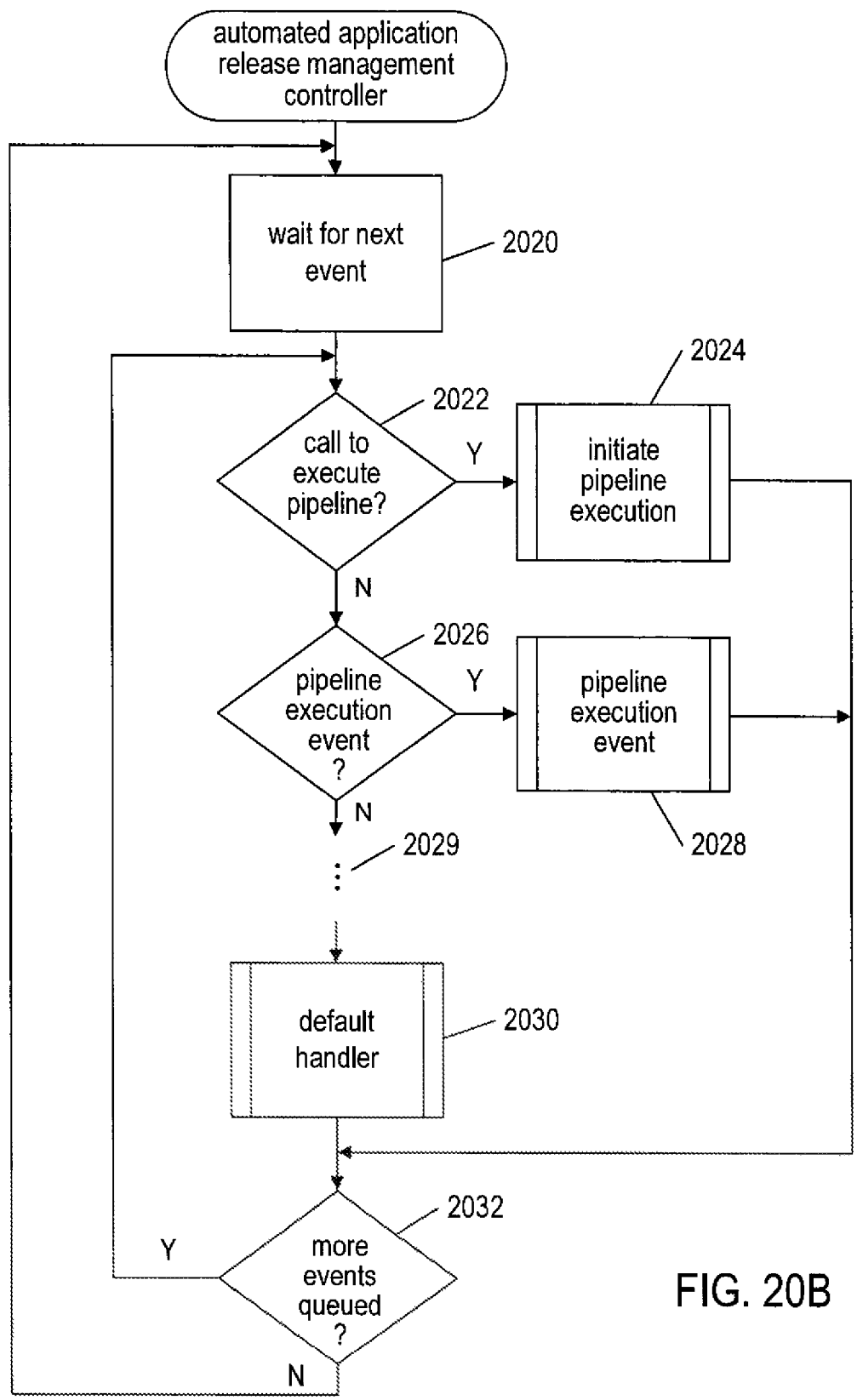

FIGS. 20A-B provide control-flow diagrams that indicate the general nature of dashboard and automated-application-release-management-controller operation. FIG. 20A shows a partial control-flow diagram for the dashboard user interface. In step 2002, the dashboard user interface waits for a next event to occur. When the next occurring event is input, by a release manager, to the dashboard to direct launching of an execution pipeline, as determined in step 2004, then the dashboard calls a launch-pipeline routine 2006 to interact with the automated-application-release-management controller to initiate pipeline execution. When the next-occurring event is reception of a pipeline task-completion event generated by the automated-application-release-management controller, as determined in step 2008, then the dashboard updates the pipeline-execution display panel within the user interface via a call to the routine "update pipeline execution display panel" in step 2010. There are many other events that the dashboard responds to, as represented by ellipses 2011, including many additional types of user input and many additional types of events generated by the automated-application-release-management controller that the dashboard responds to by altering the displayed user interface. A default handler 2012 handles rare or unexpected events. When there are more events queued for processing by the dashboard, as determined in step 2014, then control returns to step 2004. Otherwise, control returns to step 2002 where the dashboard waits for another event to occur.

FIG. 20B shows a partial control-flow diagram for the automated application-release-management controller. The control-flow diagram represents an event loop, similar to the event loop described above with reference to FIG. 20A. In step 2020, the automated application-release-management controller waits for a next event to occur. When the event is a call from the dashboard user interface to execute a pipeline, as determined in step 2022, then a routine is called, in step 2024, to initiate pipeline execution via the workflow-execution engine. When the next-occurring event is a pipeline-execution event generated by a workflow, as determined in step 2026, then a pipeline-execution-event routine is called in step 2028 to inform the dashboard of a status change in pipeline execution as well as to coordinate next steps for execution by the workflow-execution engine. Ellipses 2029 represent the many additional types of events that are handled by the event loop. A default handler 2030 handles rare and unexpected events. When there are more events queued for handling, as determined in step 2032, control returns to step 2022. Otherwise, control returns to step 2020 where the automated application-release-management controller waits for a next event to occur.

Currently Disclosed Methods and Systems that Generate Proxy-Object Interfaces to External Executables for Workflow Tasks As discussed above with reference to FIGS. 14 A-B, the work flow-execution-engine component of the workflow-based cloud-management system provides the foundation for each of the various subsystems and components of the workflow-based cloud-management system, including the automated-application-release-management subsystem, the application-deployment subsystem, and the infrastructure-management-and-administration subsystem. As discussed above with reference to FIGS. 13 A-C, workflows are high-level programs, in some cases developed through a graphical user interface that provides graphical objects that represent many of the common control structures, decision elements, tools for developing asynchronous processes, parameter passing, and other programming elements encountered in traditional compiled programming languages and interpreted script languages. Workflows may include scriptable tasks (1408 in FIG. 14A) that are written by developers in traditional scripting languages. The scriptable tasks provide a vehicle for incorporating third-party executables, such as executables corresponding to third-party software development kits ("SDKs") and third-party applications with application programming interfaces ("APIs"), into workflows. As discussed above with reference to FIG. 12, the third-party executables are made available to developers of scriptable tasks via plug-ins (1208-1214).

Figure 21:
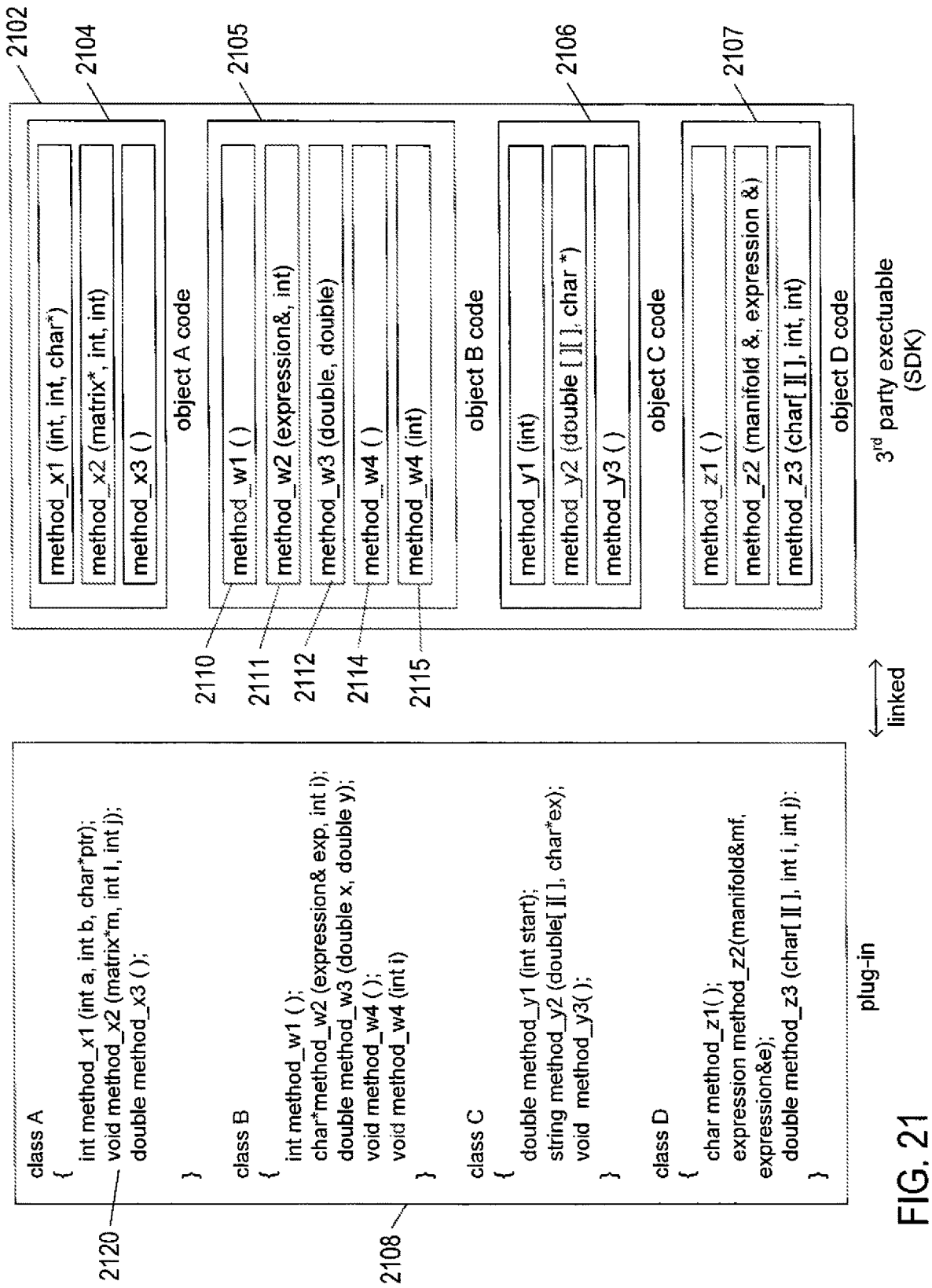
FIG. 21 illustrates plug-in development.

FIG. 21 illustrates plug-in development. The right-hand large rectangle 2102 in FIG. 21 represents a third-party executable, such as an executable including executable methods from a third-party SDK or accessed through an API. The executable includes executable methods for four objects 2104-2107. In order to generate a plug-in for the workflow-based cloud-management system, plug-in developers employ, in certain cases, automatic code generation to produce declarations for each of the classes and methods contained in the classes, shown within the left-hand rectangle 2108 in FIG. 21. These declarations, included as a header file associated with scriptable-task programs, allow scriptable-task developers to include calls to methods of third-party-executable objects in scriptable-task code. During compilation, the scriptable-task code is linked to the third-party executable 2102 so that the scriptable-task executable is able to call third-party-executable methods. For interpreted scriptable-task code, the interpreter calls third-party-executable methods through instantiated third-party classes. In general, a plug-in is created without need for access to the third-party source code. Automated code generation uses the third-party executable and, depending on the development language and development environment, additional data associated with the third-party executable.

Figure 22A:
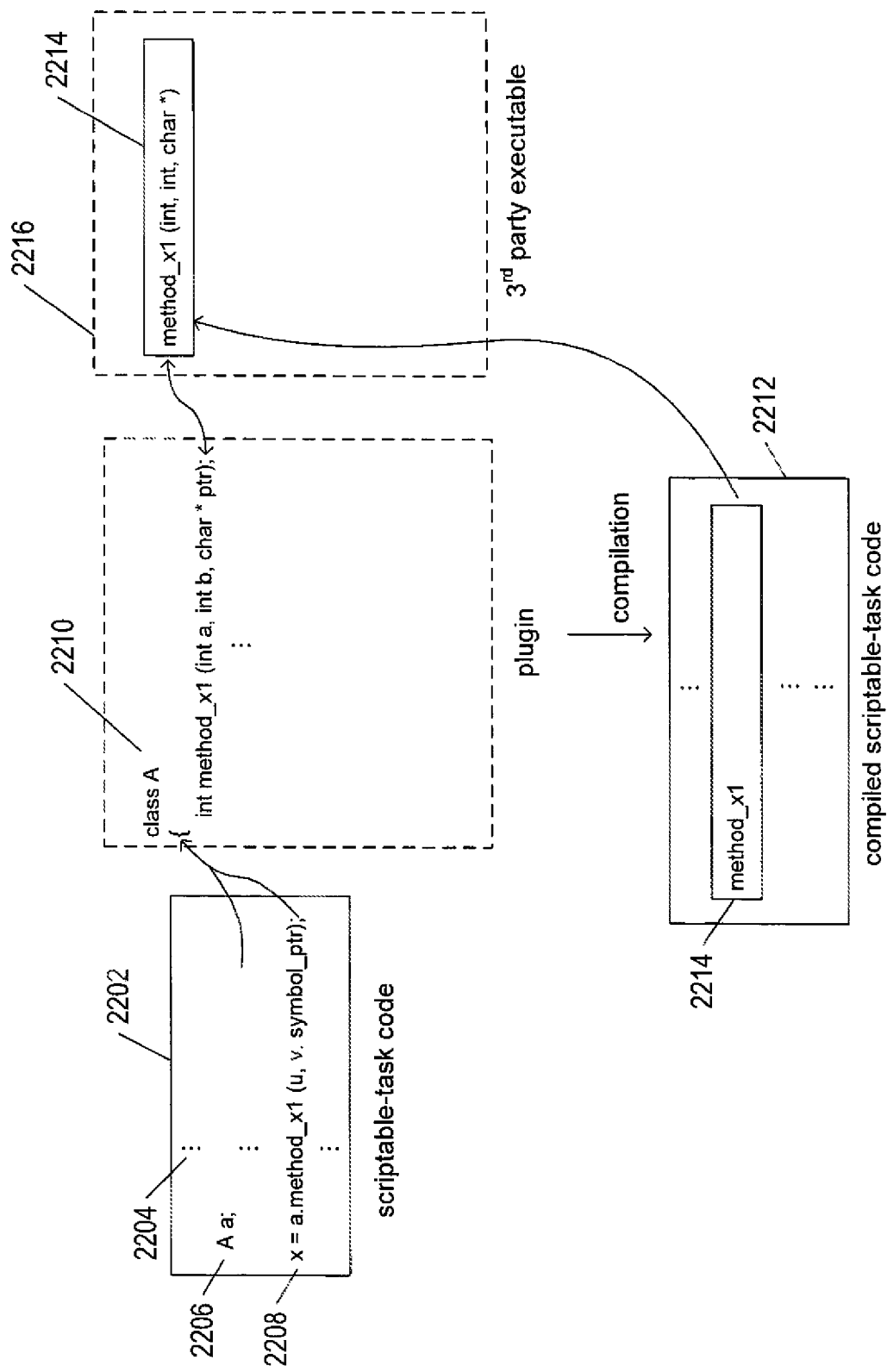
FIGS. 22A-B illustrate access to third-party methods by scriptable-task code as well as one of various problems associated with plug-ins.
Figure 22B:
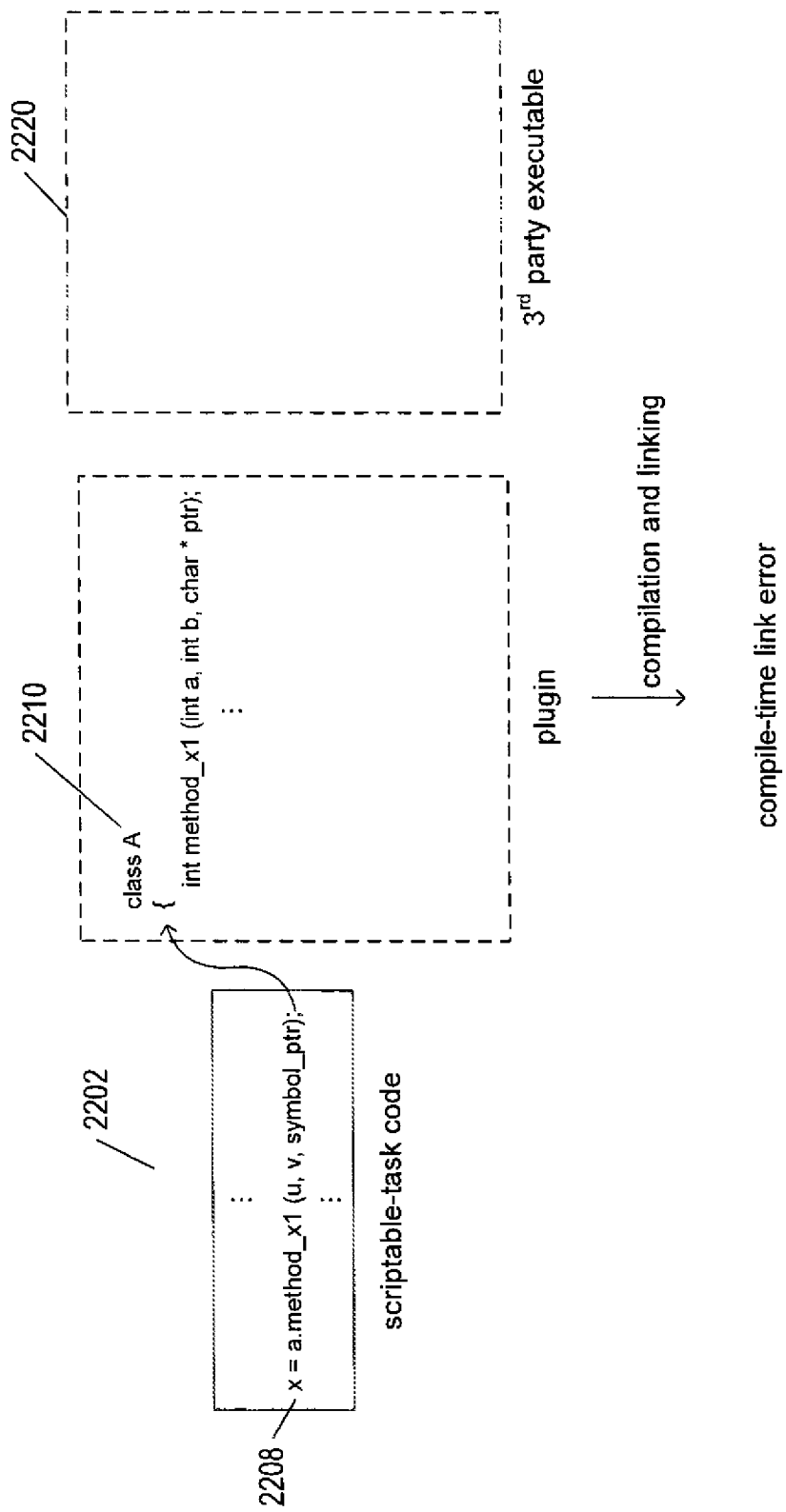

FIGS. 22A-B illustrate access to third-party methods by scriptable-task code as well as one of various problems associated with plug-ins. FIG. 22A shows a small portion of the code for a scriptable task 2202, in which ellipses, such as ellipses 2204, are used to indicate additional instructions. The scriptable-task code includes an instantiation of a third-party class 2206, also referred to as an "object," and a call to a method of the third-party object 2208. Both the instantiation and the method call are recognized by a compiler or interpreter of the scriptable-task code by using the class declaration 2210 that is included in a header or include file that is included in, or referenced by, the scriptable task code. When the scriptable-task code is compiled, the scriptable-task executable code 2212 includes a call to the third-party-executable method method_x1 2214 within the third-party executable 2216. When the scriptable-task code is interpreted, the interpreter calls the third-party-executable method method_x1 2214 within the third-party executable 2216. There are, of course, many different types of programming languages and methods for transforming source code to executables or interpreting script code as well as many different types of methods that link executables together. Thus, the details of plug-in development may vary with programming language, compiler or interpreter, operating system, and other components and parameters related to the development environment used to create scriptable tasks.

In many cases, the cycle of plug-in development and maintenance may not be synchronized with the cycle of third-party-executable releases. In such cases, classes and class methods previously encoded in the third-party executable may no longer be present in a new version of the third-party executable. Unless plug-in code is regenerated for each new version of the third-party executable, the class-declaration interface provided by the plug-in may become outdated and include classes and class methods for which there is no longer corresponding executable code in the third-party executable. FIG. 22B illustrates the implications of an outdated plug-in. FIG. 22B uses the same illustration conventions as used in FIG. 22A. The method call 2208 within the scriptable-task code 2202 is recognized by the compiler, due to the corresponding declaration 2210 within the plug-in interface, but there is no longer an entry point for the method in the third-party executable 2220. As a result, a link error occurs when a scriptable-task developer attempts to compile and link the scriptable-task code with the third-party executable. Although, as discussed further below, the scriptable-task code may be written to circumvent, at run time, missing third-party executable methods, these methods cannot be employed when a scriptable-task developer is unable to successfully compile and link scriptable-task code.

Figure 23:
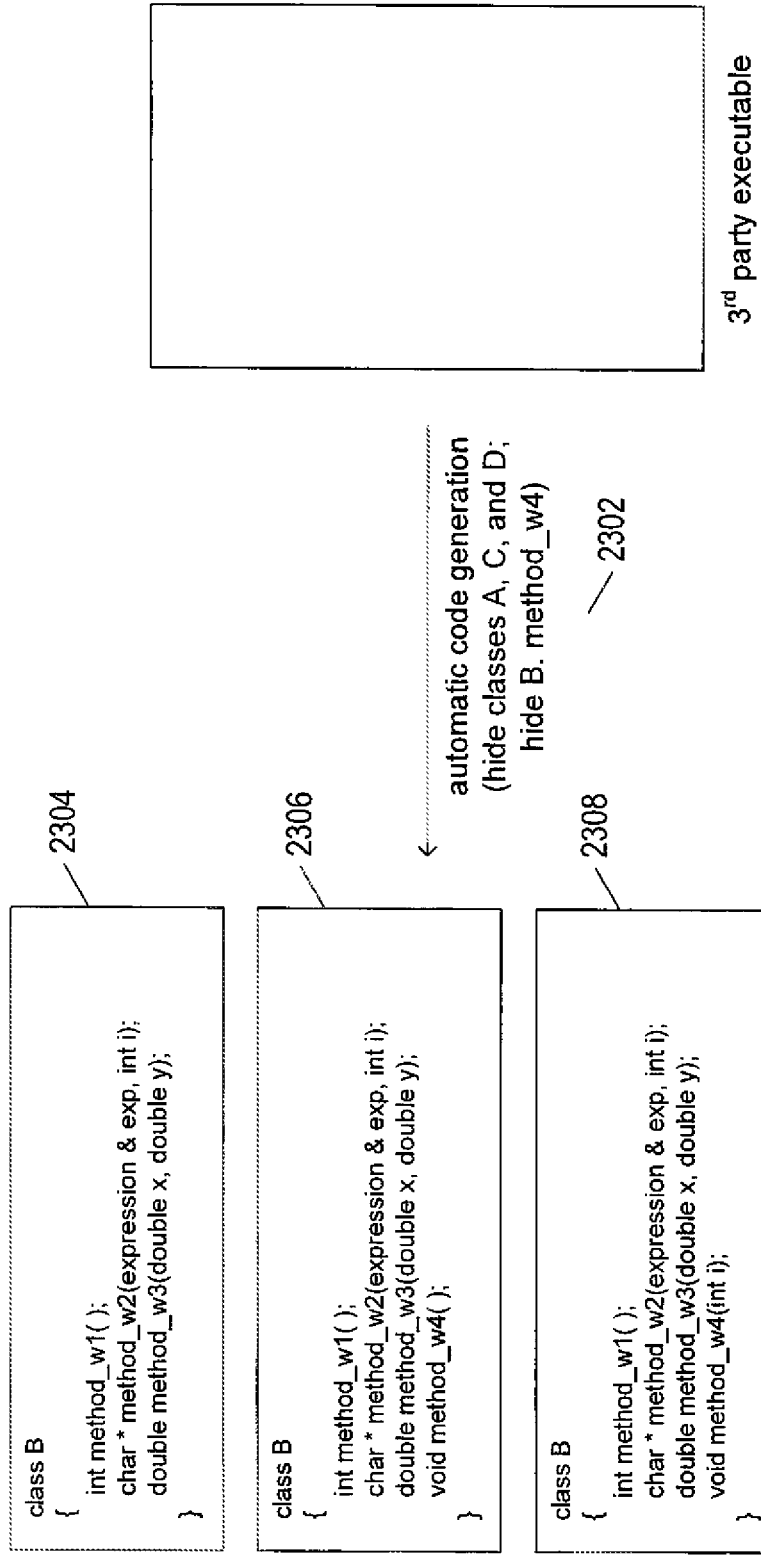
FIG. 23 illustrates another problem with interface development using automatic code generation.

FIG. 23 illustrates another problem with interface development using automatic code generation. Returning to the example of FIG. 21, suppose that the plug-in developer wishes to expose only the first three methods of class B of the third-party executable code (2105 in FIG. 21). Referring back to FIG. 21, the first three methods 2110-2112 of class B are not overloaded, but the fourth method 2114-2115, method_w4, is overloaded. The first version of method_w4 2114 takes no arguments while the second version of the method_w4 2115 takes an integer argument. Returning to FIG. 23, suppose that the automatic code generation can be instructed to hide classes and methods based on class name and method name and further suppose that the plug-in developer instructs automatic code generation to hide classes A, C, and D as well as method_w4 of class B 2302. The plug-in developer wants automatic code generation to produce class declaration 2304. However, depending on the implementation, automatic code generation may omit either the second version of the method_w4 2306 or the first version of method_w4 2308, rather than hiding both versions.

A full method signature includes the name of the method and indications of the arguments and argument types passed to the method, for many object-oriented programming languages. The full method signature, along with the name of the object that contains the method, provides a unique reference to the method, but the method name, alone, does not. The existing automatic code generation for workflow-execution-engine plug-ins is not capable of hiding methods based on full method signatures. Furthermore, even were automatic code generation able to hide methods based on full method signatures, changes to the third-party executable may introduce additional overloaded methods of which the plug-in developers are unaware, resulting in third-party methods that the plug-in developers wish to conceal from, and prevent use by, scriptable-test developers ending up in the plug-in class declaration interface.

Figure 24A:
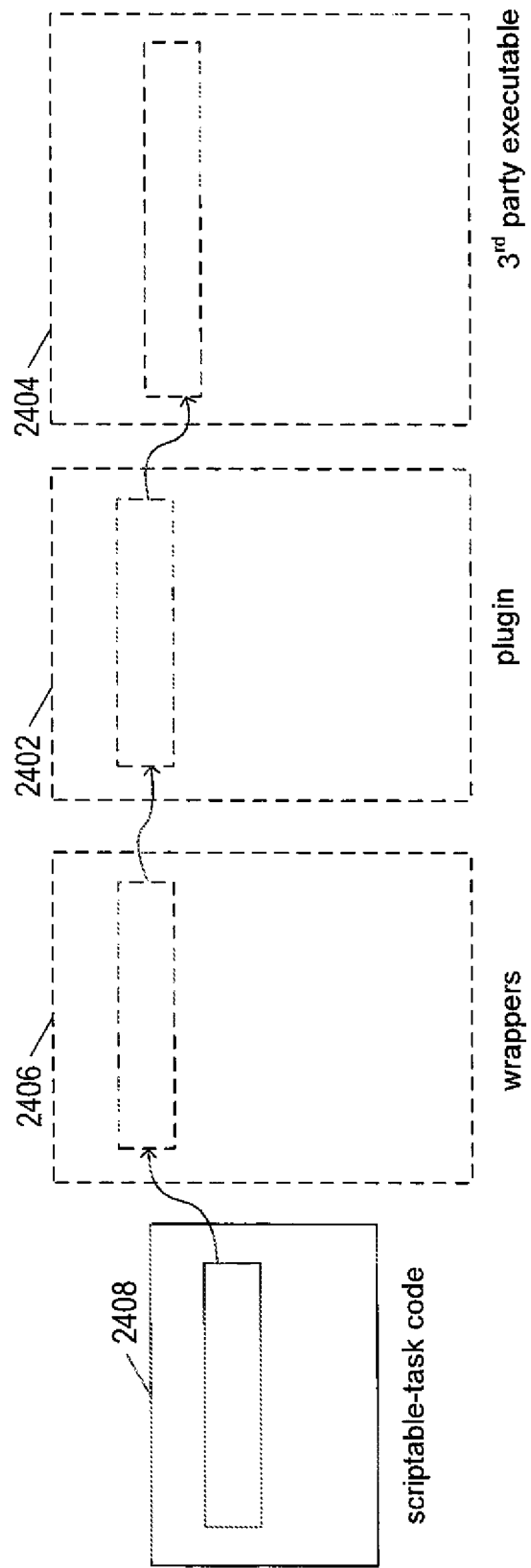

The current document is directed to methods and systems that allow plug-in developers to provide flexible and robust interfaces to third-party executables for use by scriptable-task developers. The out-of-date plug-in problem discussed above, with reference to FIG. 22B, the method-hiding problem, discussed above with reference to FIG. 23, and many other problems associated with plug-in development are ameliorated by the currently disclosed methods and systems, which provide proxy objects for each third-party object instantiated within scriptable-task code. FIGS. 24A-B illustrate the currently disclosed approach to interface development. As in the approach discussed above with reference to FIG. 21 and FIG. 22A, as shown in FIG. 24A, a plug-in interface 2402 is first obtained by automated code generation from a third-party executable 2404. In a second plug-in-development stage, wrapper classes 2406 are generated for each third-party class in the plug-in interface 2402. In certain implementations, the wrapper classes are derived, by inheritance, from the corresponding plug-in classes. The wrapper classes are provided, in a header, to allow the scriptable-task code 2408 to instantiate and call methods of the wrapper classes. Instantiation of a wrapper class produces a proxy object. In certain implementations, an original third-party object is instantiated along with each proxy object. In other implementations, the proxy object alone is instantiated, along with various additional objects that facilitate delegation, by proxy objects, to original third-party-executable methods. In fact, there are a variety of different ways in which wrapper classes and proxy objects can be implemented in different programming languages and development environments. Proxy objects allow for introduction of additional logic into third-party-executable methods via indirection. As shown in FIG. 24B, a wrapper class 2410 derived from a third-party class includes the same methods as the original third-party class (2120 in FIG. 21) but contains additional methods, represented in FIG. 24B by ellipses 2412. The number and form of these additional methods vary depending on programming language, development environment, and implementation.

Figure 25:
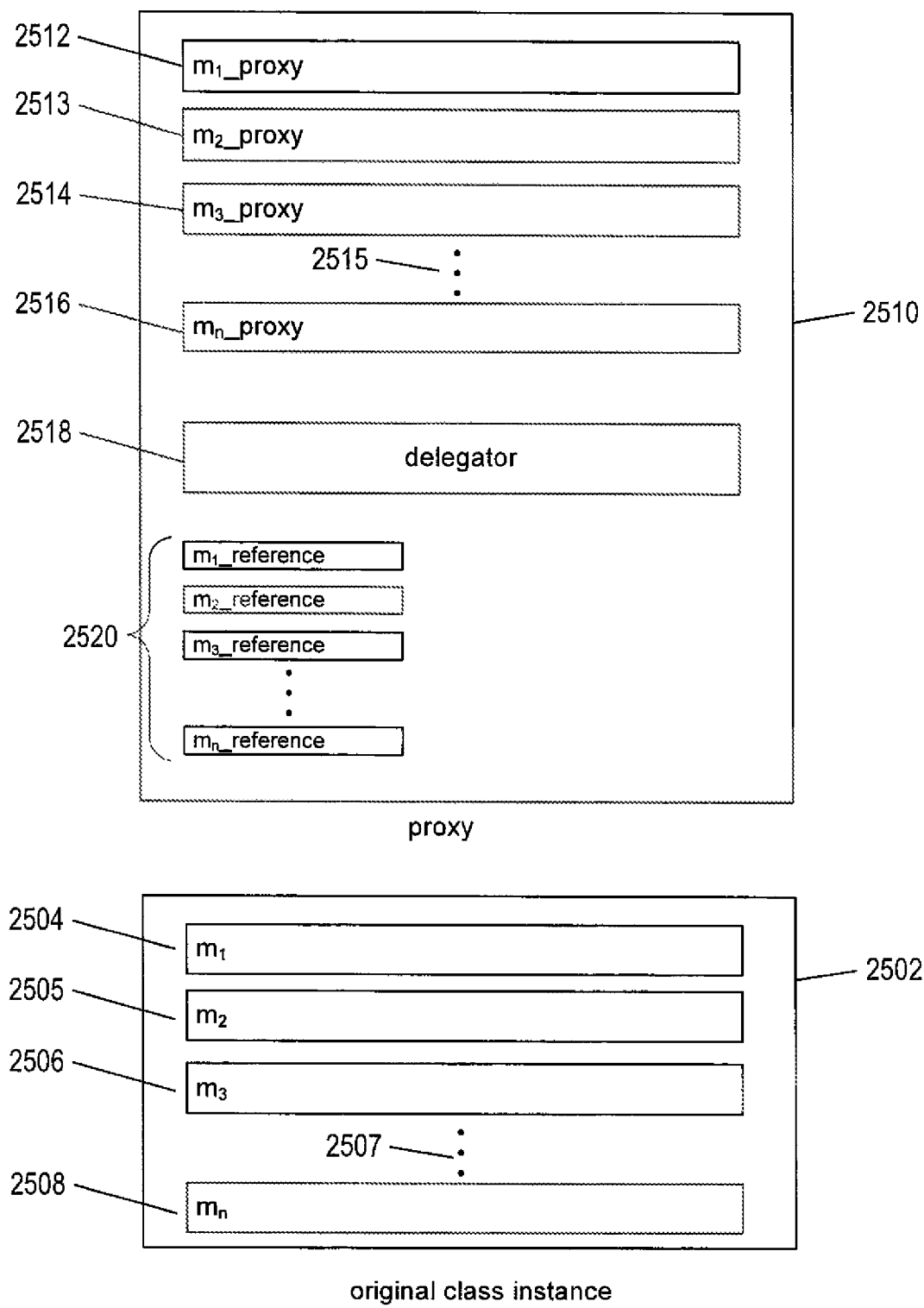
FIGS. 25-26B illustrate the proxy-based method for interface development.
Figure 26A:
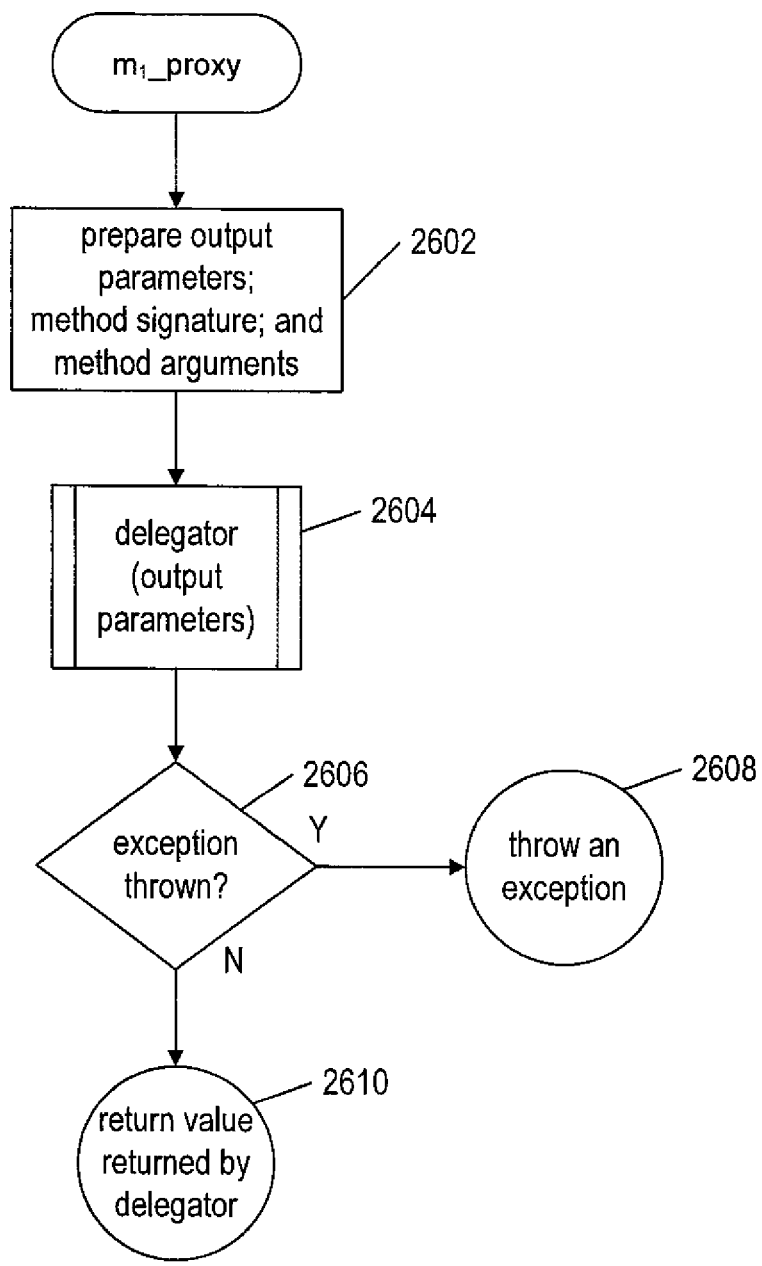
Figure 26B:
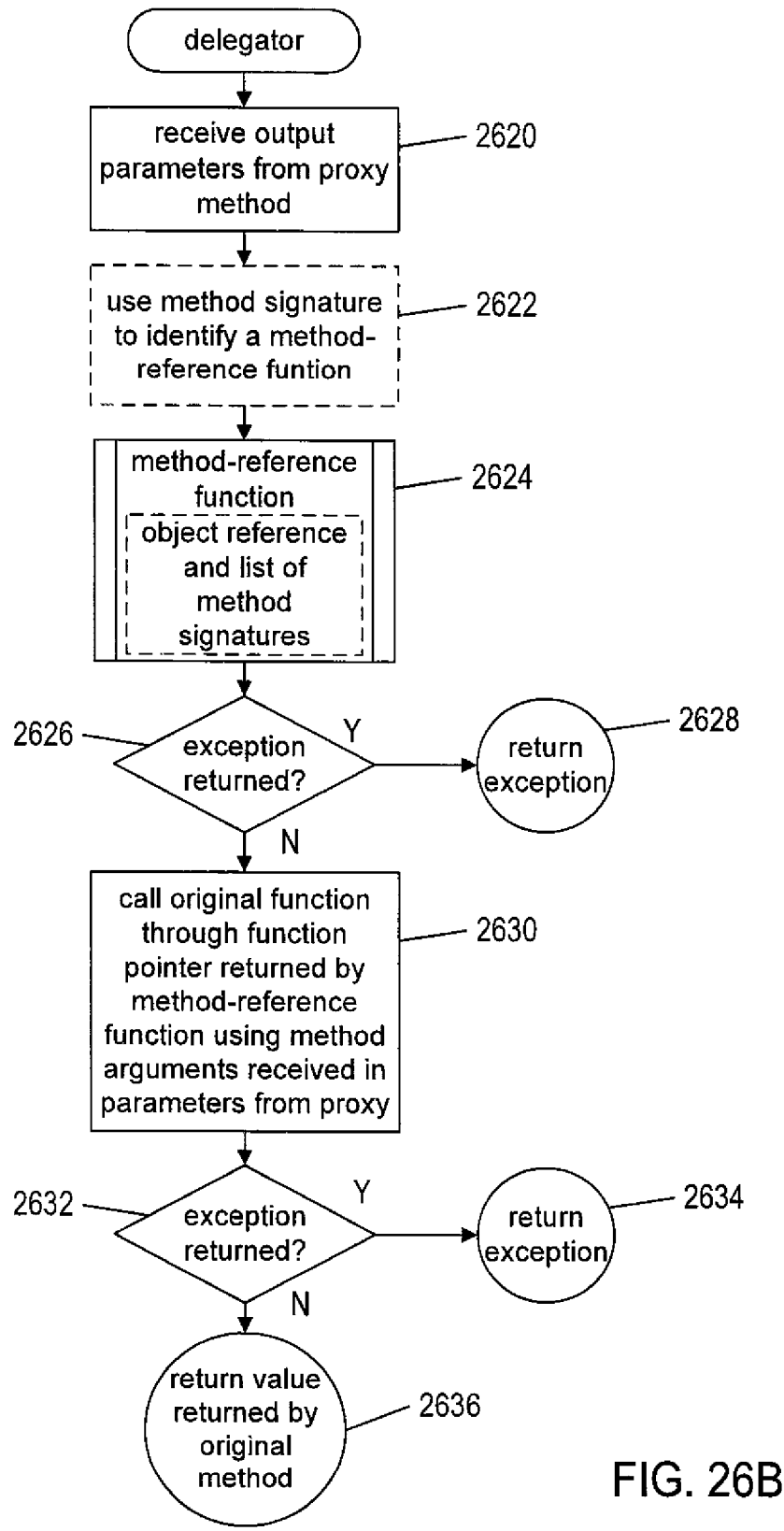

FIGS. 25-26B illustrate the proxy-based method for interface development. FIGS. 25-26B employ logical illustration conventions rather than using a specific programming language and development environment as an example. An original third-party class instance 2502 is shown in FIG. 25 to include n member functions $m_1$ 2504, $m_2$ 2505, $m_3$ 2506, additional member functions represented by ellipses 2507, and member function $m_n$ 2508. The corresponding proxy instance 2510 includes proxy methods 2512-2516 corresponding to the original-class-instance methods 2504-2508. Because, in certain implementations, the proxy methods overload the original-class-instance methods, they have the same method signatures as the original-class-instance methods so that a proxy object can be accessed by a scriptable-task developer in the same manner as the corresponding original-class-instance methods. The proxy object 2510 additionally includes a delegator method 2518 and a set of method-reference functions 2520. In many implementations, the delegator method 2518 and the method-reference functions 2520 are not actually included within the proxy class, but are instead included in a separate delegation-facilitator class instance that is used by methods within many different types of proxy objects. In this case, additional arguments are passed to the delegator method, including an object reference, and a single method-reference function may be implemented. The method-reference function or method-reference functions return a function pointer to an original-third-party-object method corresponding to a proxy method. The delegator method uses the method-reference function or method-reference functions, depending on the implementation, to delegate a call to a method of a proxy object to the same method of the corresponding original third-party class method. However, the delegator method may incorporate additional logic that would be unavailable to code calling the original third-party class method. In the currently discussed methods and systems, introduction of the delegator method allows run-time exceptions to be generated in the case that a call is made to a third-party method that no longer exists in the third-party executable and in the case that a call is made to a third-party method that has been intentionally hidden by the plug-in developer.

FIG. 26a provides a control-flow diagram for a first proxy method for the first original-class method of the example of FIG. 25. In step 2602, the proxy method prepares a set of output parameters that include the method signature of the proxy method and the corresponding original-class method as well as one or more arguments received by the proxy method and the corresponding original-class-instance method, when the proxy method and the corresponding original-class-instance method receive one or more arguments. In step 2604, the proxy method calls the delegator method, passing the output parameters prepared in step 2602 to the delegator method. When the delegator method throws an exception, as determined in step 2606, the proxy method throws the same exception or a different exception, in step 2608. Otherwise, in step 2610, the proxy method returns whatever value is returned by the delegator method.

FIG. 26B provides a control-flow diagram for the delegator method (2518 in FIG. 25). In step 2620, the delegator method receives the parameters passed to the delegator method by the proxy method. In step 2622, the delegator method uses the method-signature parameter to identify a method-reference function from among the set of method-reference functions (2520 in FIG. 25) from which to obtain a reference to the original-class method corresponding to the proxy method that has called the delegator method. In step 2624, the delegator method calls the method-reference function to obtain a function pointer to the original-class-instance method. In an alternative implementation, when a single delegator method is used for delegation of proxy methods within multiple proxy objects and a single method-reference function is also used, step 2622 is omitted and a common method-reference function is called in step 2624 to which an object reference provided as one of the parameters received by the delegator method is passed along with the method signature for the calling method. In either case, the delegator method receives a function pointer to the original third-party class method when the method-reference function successfully returns. However, the method-reference function may instead throw an exception, as determined in step 2626, in which case the delegator method returns that exception or a different exception in step 2628. For example, when the called method has been intentionally hidden by a plug-in developer, the method-reference function throws an exception resulting in an exception thrown by the delegator method. This results in throwing of an exception by the proxy method, in step 2608 of FIG. 26B. When a call to a proxy method throws an exception, a scriptable task that made the call to the proxy method can handle the exception at runtime. For example, the scriptable task may return an error, may call a different method from a different third-party executable, or take any of many other ameliorative actions. When the method-reference function does not throw an exception, then, in step 2630, the delegator method calls the original third-party method corresponding to the proxy method using the function pointer returned by the method-reference function. The call is made using the method arguments passed to the delegator method by the calling proxy method. When the function pointer is invalid, the call to the original function results in an exception, as determined in step 2632 and the delegator method throws the same exception or a different exception in step 2634. Thus, when the third-party executable has been modified to eliminate a particular method, a call to that method through the plug-in interface results in a thrown exception, allowing the scriptable task that called the method to undertake, at runtime, any of the above-mentioned ameliorative actions. Otherwise, when the call to the original third-party method succeeds, the value returned by the original third-party method is returned in step 2636.

Figure 27A:
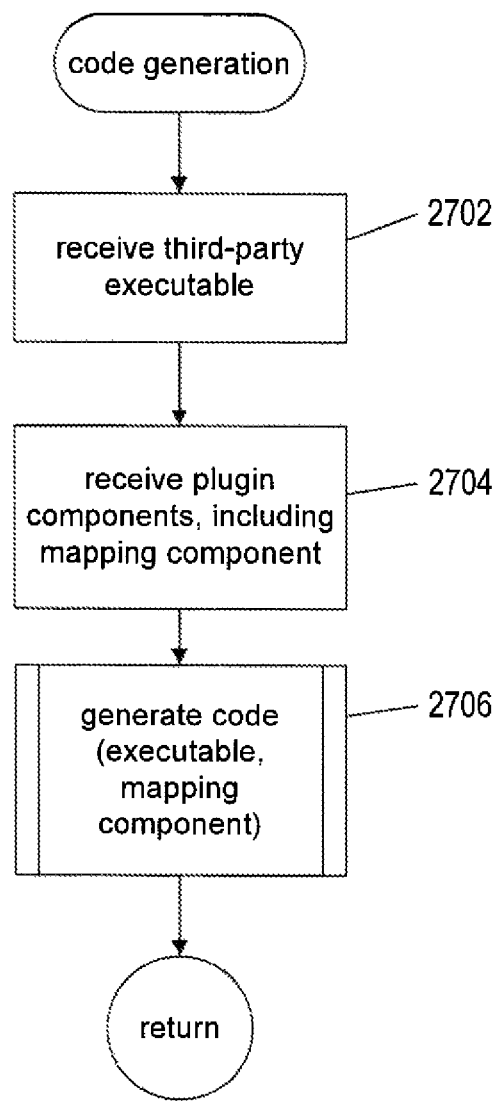
FIGS. 27A-C provide control-flow diagrams that illustrate an automated code-generation approach that is used, in certain implementations, to automatically generate the plug-in interface as well as the wrapper classes.
Figure 27B:
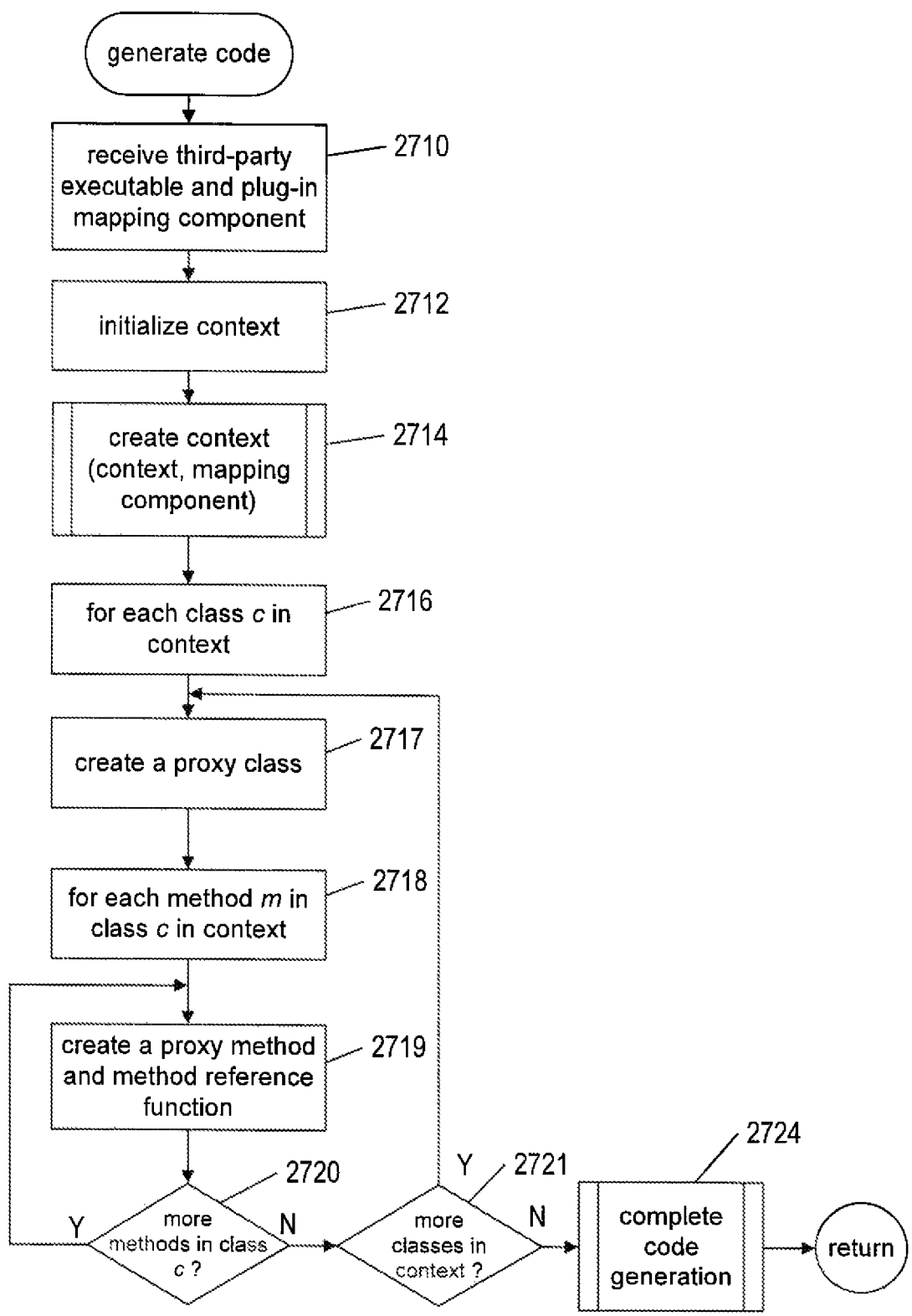

FIGS. 27A-B provide control-flow diagrams that illustrate an automated code-generation approach that is used, in certain implementations, to automatically generate the plug-in interface as well as the wrapper classes according to the above-discussed interface-development methods and systems. FIG. 27A provides a control-flow diagram for a routine "code generation." In step 2702, the routine "code generation" receives a third-party executable. In step 2704, the routine "code generation" receives components of a plug-in, created by a plug-in developer, including a mapping component which defines third-party-executable objects that the plug-in developer wishes to be wrapped, as well as specifications of relationships between objects and indications of whether objects should be extended to include additional methods and data members. In step 2706, the routine "code generation" calls a routine "generate code," passing to the routine a reference to the third-party executable and the mapping component of the plug-in.

FIG. 27B provides a control-flow diagram for the routine "generate code," called in step 2706 of FIG. 27A. In step 2710, the routine "generate code" receives the reference to the third-party executable as well as the mapping component of the plug-in. In step 2712, the routine "generate code" initializes a code-generation context that is used to store information for generating the plug-in code. In step 2714, the routine "generate code" calls a routine "create context" to store the information needed for code generation into the context data structure initialized in step 2712. In the outer for-loop of steps 2716-2721, each class c specified in the context is considered. In step 2717, during each iteration of the for-loop of steps 2716-2721, a proxy class for the currently considered class c is created. Then, in the inner for-loop of steps 2718-2720, each method m in class c specified in the context is considered. For each considered method m, the routine "generate code" creates a proxy method and method reference function for method m in the proxy class, in step 2719. Finally, in step 2724, additional code-generation tasks are carried out to produce a complete code-level implementation for the plug-in.

Figure 27C:
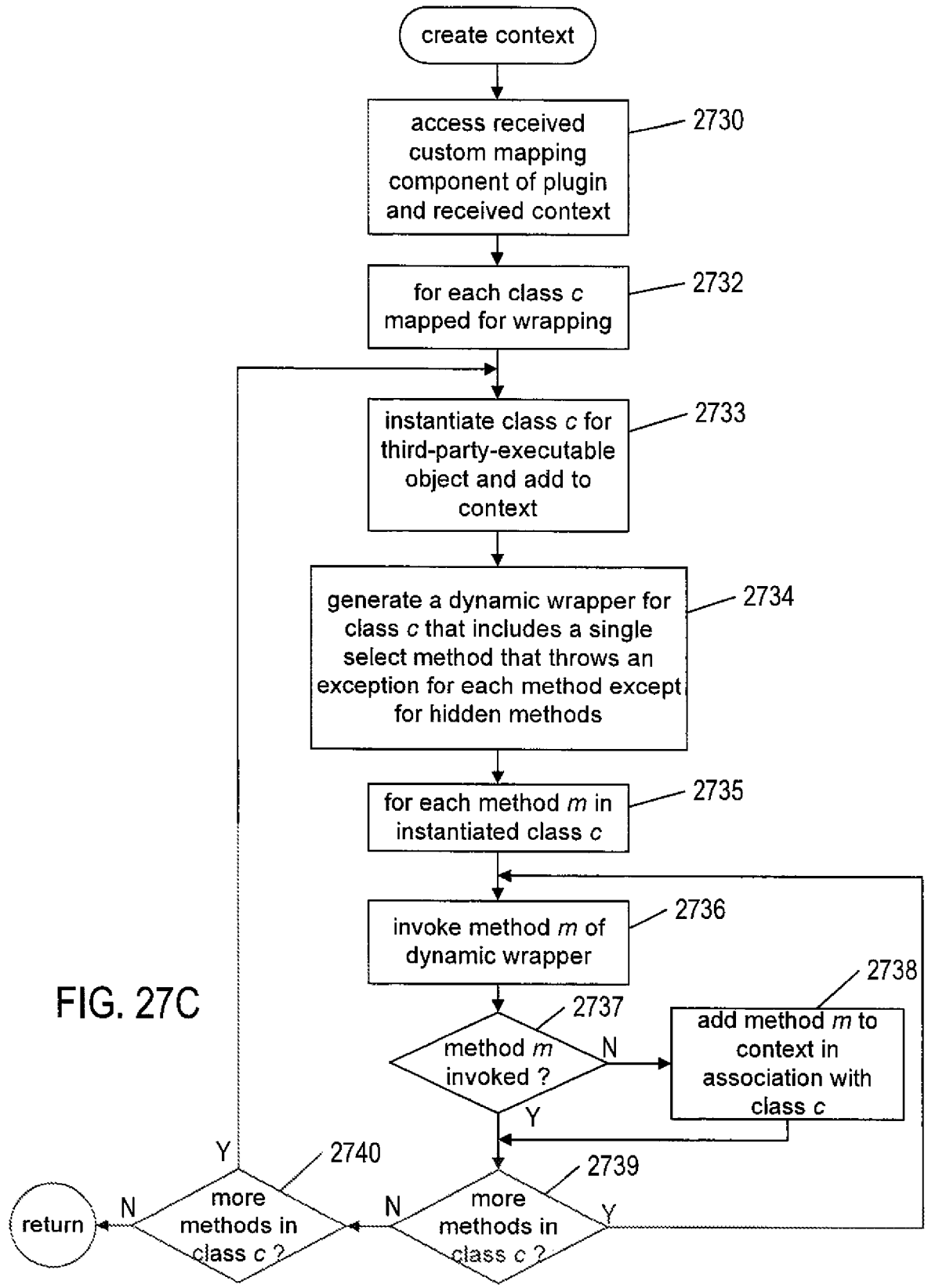

FIG. 27C provides a control-flow diagram for the routine "create context," called in step 2714 of FIG. 27B. In step 2730, the routine "create context" receives references to the mapping component of the plug-in and to the context data structure and accesses these data structures through the received references. In the outer for-loop of steps 2732-2740, each class c specified by the mapping component for wrapping is considered. In step 2733, the currently considered class c is instantiated for accessing a corresponding third-party-executable object and is added to the context. In step 2734, a dynamic wrapper is generated for class c. The dynamic wrapper includes a single select method used to invoke a method call directed to an instance of the dynamic wrapper. The select method is constructed to return an exception for all but calls made to methods that are desired to be hidden by the plug-in developer. Then, in the inner for-loop of steps 2735-2739, each method m in the instantiated class c is considered. In step 2736, an attempt is made to invoke the currently considered method m of the dynamic wrapper. When method invocation is successful, as determined in step 2737, no further action is taken. However, when method invocation is not successful, as determined in step 2737, method m is added to the context in association with class c to specify that the method should be included in the proxy class for class c.

Although the present invention has been described in terms of particular embodiments, it is not intended that the invention be limited to these embodiments. Modifications within the spirit of the invention will be apparent to those skilled in the art. For example, any of many different implementation and design parameters, including choice of operating system, virtualization layer, hardware platform, programming language, modular organization, control structures, data structures, and other such design and implementation parameters can be varied to generate a variety of alternative implementations of the current disclosed automated-application-release-management subsystem and management controller. As mentioned above, various different approaches can be used to generate proxy objects, which comprise a more robust and flexible interface to third-party executables than currently used plug-in interfaces. Proxy-object methods and delegators methods may include logic that is executed along with corresponding third-party methods in addition to the exception-generating logic discussed above. While the currently disclosed proxy methods throw exceptions to handle calls to hidden methods and calls to methods no longer present in the third-party executable, other types of error handling may be invoked, in alternative implementations, including returning an error code.

The invention claimed is:

1. An automated system that generates a proxy-class interface for an external executable that is used by a task included in a workflow executed by a workflow-execution engine to access external methods, the automated system comprising:
one or more processors;
one or memories;
one or more mass-storage devices; and
computer instructions, stored in one or more of the one or more memories that, when executed by one or more of the one or more processors, control the automated system to
generate one or more proxy-classes, each proxy class having one or more methods that each delegates execution to a corresponding executable method in the external executable by
searching for an external-executable entrypoint that references the corresponding executable method in the external executable,
when an external-executable entrypoint is found,
calling the corresponding external-executable entrypoint, and
when the external-executable entrypoint is not found,
returning an error, and
store, in one or more of the one or more mass-storage devices, the one or more generated proxy classes as a proxy-class interface.

2. The automated system of claim 1 wherein the external executable is one of:
an executable component of a third-party SDK; and
an executable generated from a third-party application.

3. The automated system of claim 1 wherein the proxy-class interface is provided, along with task code, to a compiler that generates a corresponding task executable that includes one or more instructions that call methods in the external executable.

4. The automated system of claim 1 wherein the proxy-class interface is provided, along with code, to an interpreter that calls one or more methods in the external executable to execute method calls to the external executable included in the task code.

5. The automated system of claim 1 wherein a method of the proxy class delegates execution to the corresponding executable method in the external executable by calling a proxy-class delegator method that
attempts to find an external-executable entrypoint for the corresponding executable method in the external executable;
when an external-executable entrypoint cannot be found or when the external-executable entrypoint is hidden, returns an error; and
when an external-executable entrypoint is found and when the external-executable entrypoint is not hidden, calls the corresponding external-executable entrypoint.

6. The automated system of claim 1 wherein, when the delegator method calls the corresponding external-executable entrypoint and the corresponding external-executable entrypoint is not present in the external executable, or the external-executable entrypoint is hidden, the delegator method returns an error.

7. The automated system of claim 6 wherein the delegator method returns an error by one of:
returning an error value; and
generating an exception.

8. The automated system of claim 1 wherein the automated interface-generation system uses automated code generation to generate an interface to the external executable prior to generating the one or more proxy-classes from corresponding classes in the interface to the external executable generated by automated code generation.

9. The automated system of claim 1 wherein the automated system is directed, by input parameters, to:
generate classes for specific external classes; and
hide methods within external classes.

10. The automated system of claim 1, wherein the automated system is incorporated into a workflow-based cloud-management facility having
multiple servers,
data-storage devices,
one or more internal networks,
the workflow-execution engine,
an automated-application-release-management subsystem,
an automated-application-deployment subsystem, and
an infrastructure-management-and-administration subsystem.

11. The automated system of claim 1 wherein tasks are a type of workflow element that is included in workflows executed by the workflow-execution engine, allowing customized routines to be included in workflows.

12. A method that generates a plug-in interface for an external executable that is used by a task included in a workflow executed by a workflow-execution engine to access external methods, the method comprising:
generating, by an automated interface-generation system, one or more proxy-classes, each proxy class having one or more methods that each delegates execution to a corresponding executable method in the external executable by
searching for an external-executable entrypoint that references the corresponding executable method in the external executable,
when an external-executable entrypoint is found,
calling the corresponding external-executable entrypoint, and
when the external-executable entrypoint is not found,
returning an error, and
storing, in one or more mass-storage devices, the one or more generated proxy classes within the plug-in interface.

13. The method of claim 12 wherein the automated interface-generation system comprises:
- one or more processors;
- one or memories; and
- the one or more mass-storage devices.

14. The method of claim 12 wherein plug-in interface is subsequently provided, along with scriptable-task code, to a compiler that generates a corresponding scriptable-task executable that includes one or more instructions that call methods in the external executable.

15. The method of claim 12 wherein plug-in interface is subsequently provided, along with scriptable-task code, to an interpreter that calls one or more methods in the external executable to execute method calls to the external executable included in the scriptable-task code.

16. The method of claim 12 wherein, when the delegator method calls the corresponding external-executable entrypoint and the corresponding external-executable entrypoint is not present in the external executable, or the external-executable entrypoint is hidden, the delegator returns an error.

17. The method of claim 12 wherein the delegator method returns an error by one of:
- returning an error value; and
- generating an exception.

18. A physical data-storage device that stores a sequence of computer instructions that, when executed by one or more processors within an automated interface-generation system having one or more processors, one or memories, and one or more mass-storage devices, control the automated interface-generation system to generate a plug-in interface for an external executable that is used by a task included in a workflow executed by a workflow-execution engine to access external methods by:
- generating one or more proxy-classes, each proxy class having one or more methods that each delegates execution to a corresponding executable method in the external executable by
    - searching for an external-executable entrypoint that references the corresponding executable method in the external executable,
    - when an external-executable entrypoint is found, calling the corresponding external-executable entrypoint, and
    - when the external-executable entrypoint is not found, returning an error, and
- storing, in one or more of the one or more mass-storage devices, the one or more generated proxy classes within the plug-in interface.

* * * * *